(12) United States Patent
Janisch et al.

(10) Patent No.: US 11,397,098 B2
(45) Date of Patent: Jul. 26, 2022

(54) METHOD FOR DETECTING ERRORS IN A ROTATING POSITION SENSOR SYSTEM HAVING SINE AND COSINE SIGNALS

(71) Applicant: Integrated Device Technology, Inc., San Jose, CA (US)

(72) Inventors: Josef Janisch, Ilz (AT); Erhard Muesch, Werne (DE)

(73) Assignee: Integrated Device Technology, Inc., San Jose, CA (US)

( * ) Notice: Subject to any disclaimer, the term of this patent is extended or adjusted under 35 U.S.C. 154(b) by 306 days.

(21) Appl. No.: 16/600,350

(22) Filed: Oct. 11, 2019

(65) Prior Publication Data

US 2020/0116532 A1 Apr. 16, 2020

Related U.S. Application Data

(60) Provisional application No. 62/745,936, filed on Oct. 15, 2018.

(51) Int. Cl.
  *G01D 5/244* (2006.01)
(52) U.S. Cl.
  CPC .................. *G01D 5/2448* (2013.01)
(58) Field of Classification Search
  CPC ................................... G01D 5/2448
  USPC ........................................... 702/94
  See application file for complete search history.

(56) References Cited

U.S. PATENT DOCUMENTS

| 6,320,344 B1* | 11/2001 | Sakamoto | G05B 19/19 318/567 |
| 6,542,842 B2* | 4/2003 | Godler | G01P 21/02 73/504.03 |
| 2013/0268234 A1 | 10/2013 | Janisch | |
| 2014/0331076 A1 | 11/2014 | Yoshida | |

FOREIGN PATENT DOCUMENTS

| EP | 1341311 A2 | 9/2003 |
| EP | 1341311 A3 | 4/2004 |
| JP | 2010071783 A | 4/2010 |

(Continued)

OTHER PUBLICATIONS

Office Action dated Feb. 8, 2021 issued in related European Patent App. No. 19203287.8 (4 pages).

(Continued)

*Primary Examiner* — Aditya S Bhat
(74) *Attorney, Agent, or Firm* — Haynes and Boone, LLP

(57) ABSTRACT

In some embodiments, a method of correcting for errors in a rotational position sensor having a sine signal and a cosine signal is presented. The method includes compiling data from the sine signal and the cosine signal over a period of rotation of a motor shaft; determining offset correction parameters from the data; correcting the data with the offset correction parameters; determining amplitude difference parameters from the data; correcting the data with the amplitude difference parameters; determining phase difference parameters from the data; correcting the data with the phase difference parameters; and using the offset correction parameters, the amplitude difference parameters, and the phase difference parameters to correct the sine signal and the cosine signal.

10 Claims, 18 Drawing Sheets

(56) References Cited

FOREIGN PATENT DOCUMENTS

| JP | 2012132805 A | 7/2012 |
| JP | 2017151061 A | 8/2017 |
| WO | 2006092026 A1 | 9/2006 |

OTHER PUBLICATIONS

Extended European Search Report from European Patent Application No. 19203287.8, dated Mar. 11, 2020, pp. 1-6.

\* cited by examiner

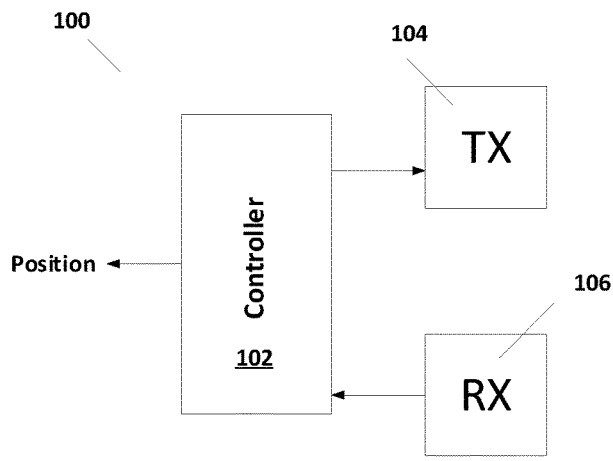
Figure 1A
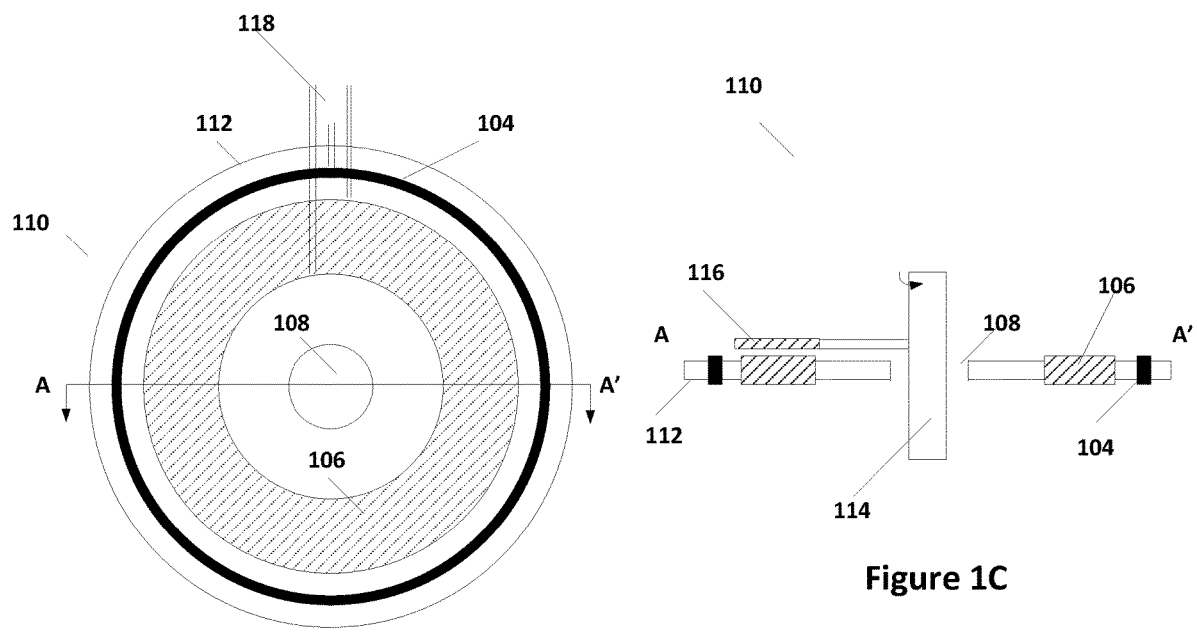
Figure 1B
Figure 1C

Figure 9A
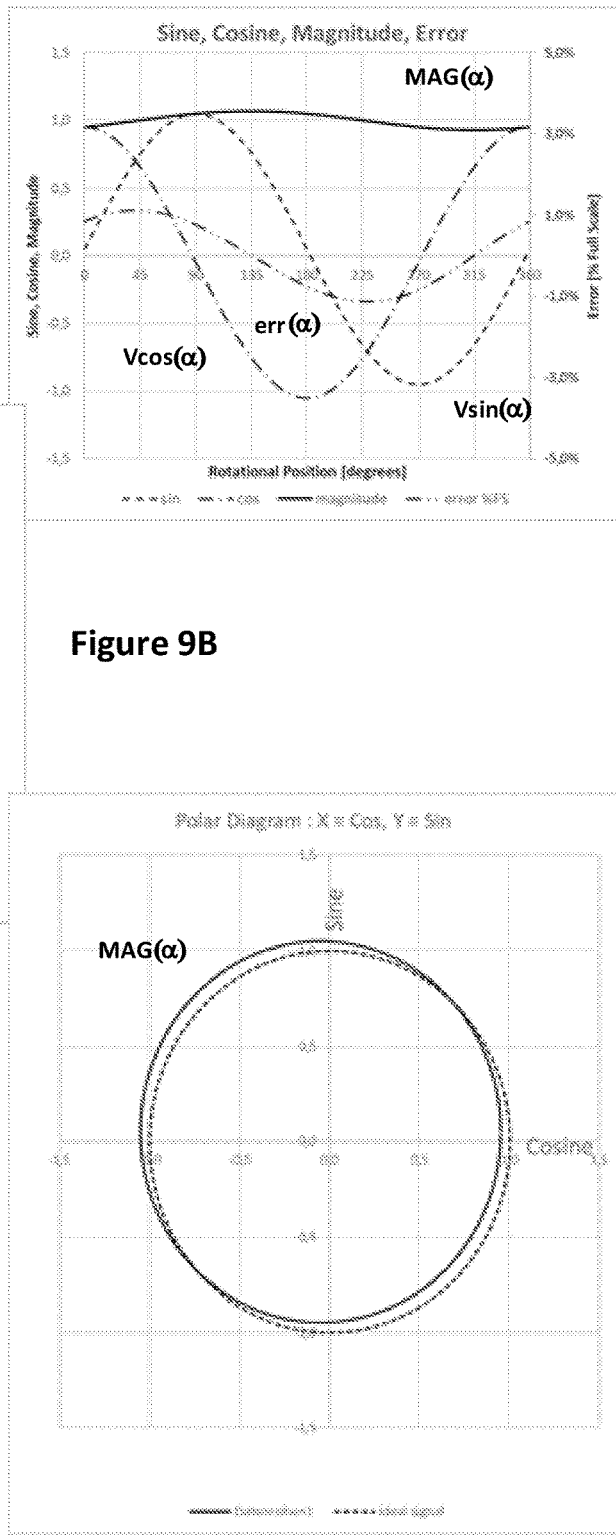
Figure 9B
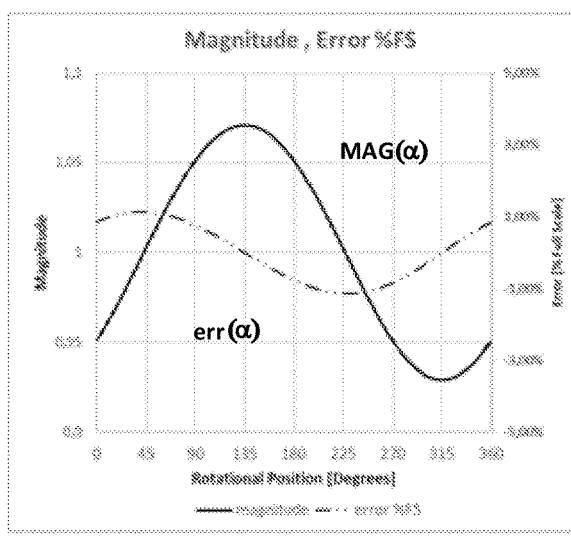
Figure 9C

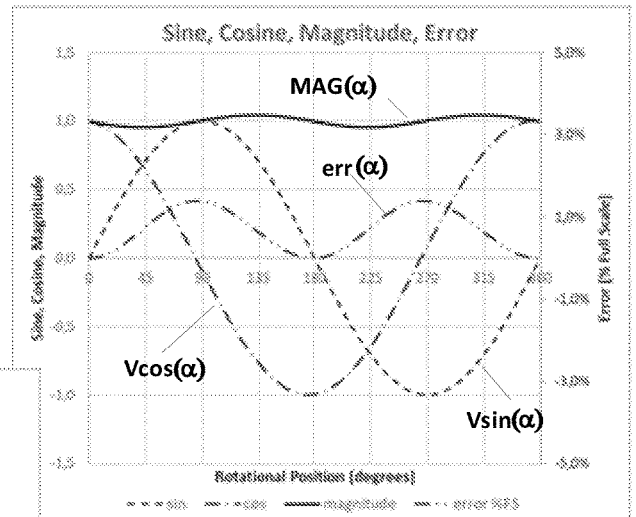
Figure 13A
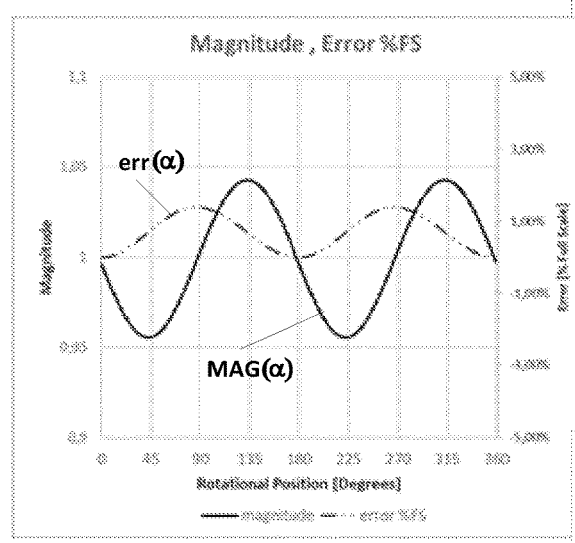
Figure 13B
Figure 13C
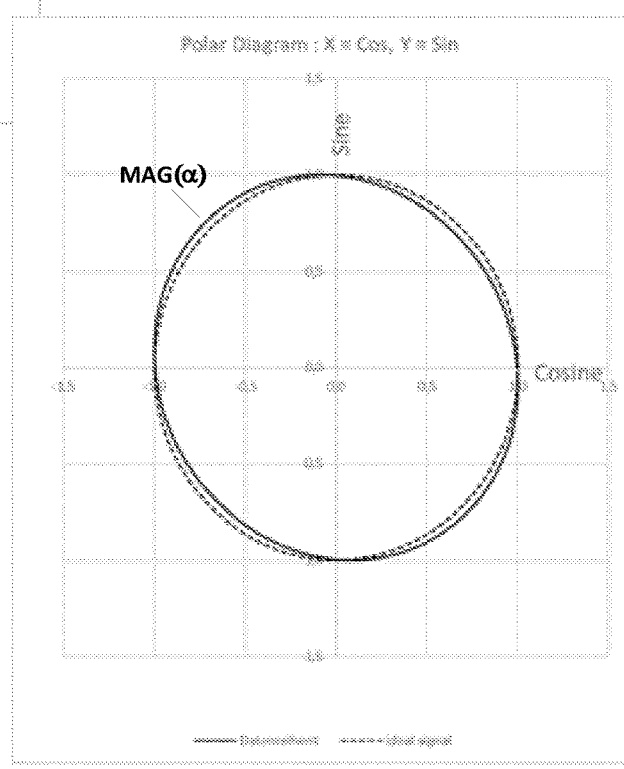

METHOD FOR DETECTING ERRORS IN A ROTATING POSITION SENSOR SYSTEM HAVING SINE AND COSINE SIGNALS

RELATED APPLICATION

This disclosure claims priority to U.S. Provisional Application Ser. No. 62/745,936, filed on Oct. 15, 2018, which is herein incorporated by reference in its entirety.

TECHNICAL FIELD

Embodiments of the present invention are related to position sensors and, in particular, to a method for detecting errors in a rotational position sensor system having sine and cosine signals.

DISCUSSION OF RELATED ART

Position sensors are used in various settings for measuring the position of one component with respect to another. Inductive position sensors can be used in automotive, industrial and consumer applications for absolute rotary and linear motion sensing. In many inductive positioning sensing systems, a transmitter coil is driven to induce eddy currents in a metallic target that is sliding or rotating above a set of receiver coils. Receiver coils receive the magnetic field generated from eddy currents and the transmitter coils and provide signals to a processor. The processor uses the signals from the receiver coils to determine the position of the metallic target above the set of receiver coils. The processor, transmitter coils, and receiver coils may all be formed on a printed circuit board (PCB).

However, these systems exhibit inaccuracies and are then calibrated to account for these inaccuracies. One major concern in a sensor system is the need for understanding the overall error of the sensor information provided by the signal chain in the sensor module (Sensor raw data+analog signal processing+digital signal processing). One effective way to investigate the error of a sensor system is to compare the sensor results with a known good reference. However, for cost and handling reasons, this method can be used only for product development and during the end-of-line calibration in a production line, but is not generally used on every unit produced during normal operation.

Another effective way is to use a redundant method where two independent sensors are measuring the same physical parameter (e.g. rotary position) and the Electric Control Unit (ECU) compares the two sensor results. A deviation of the two sensor output signals is considered a failure of the system, but it might not reveal which sensor is defective and which one is operating correctly.

Particularly in high speed sensor systems, as for example in a rotor position sensor of an electric motor, the sensor signal cannot be interrupted during operation, therefore it is not allowed, for example, to replace the sensor raw signal with a known reference signal for making a reference measurement. Therefore, the error analysis must be performed with the un-interrupted sine and cosine signals.

Therefore, there is a need to develop better methods of detecting and reducing position sensor errors.

SUMMARY

In some embodiments, a method of correcting for errors in a rotational position sensor having a sine signal and a cosine signal is presented. The method includes compiling data from the sine signal and the cosine signal over a period of rotation of a motor shaft; determining offset correction parameters from the data; correcting the data with the offset correction parameters; determining amplitude difference parameters from the data; correcting the data with the amplitude difference parameters; determining phase difference parameters from the data; correcting the data with the phase difference parameters; and using the offset correction parameters, the amplitude difference parameters, and the phase difference parameters to correct the sine signal and the cosine signal.

These and other embodiments are discussed below with respect to the following figures.

BRIEF DESCRIPTION OF THE FIGURES

FIGS. 1A, 1B, and 1C illustrate an inductive position sensor.

FIGS. 9A, 9B, and 9C illustrate a combination of offsets on the sine and the cosine signals.

FIGS. 13A, 13B, and 13C illustrates a cosine to sine phase shift greater than 90 degrees.

Figure 2A:
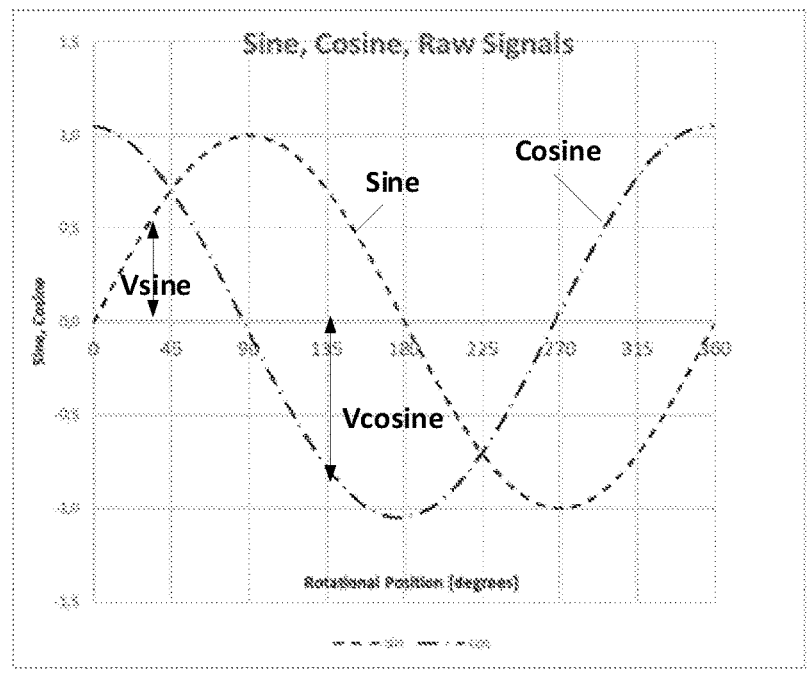
FIG. 2A illustrates raw signals of a position sensor.

These and other aspects of embodiments of the present invention are further discussed below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Some embodiments of this invention provide a simple method is described, which allows precise error determination from the sine and cosine signals without the need of a reference sensor and likewise without the need of a second, redundant sensor. The method is based on the fact that in a sensor system having offset errors, either on one or on both sensor signals (sine and/or cosine) there is a fixed relation between the normalized ripple on the magnitude of the signal and the normalized, full scale peak-to-peak error over a full period. Likewise, in a sensor system having gain and/or phase errors in the sensor signals (sine and/or cosine) there is the same fixed relation between the normalized ripple on the magnitude of the signal and the normalized peak-to-peak error over a full period.

Many types of position sensors, particularly position sensors for detecting rotary movement, provide the raw sensor data in the form of sinusoidal signal, where one period of the sensor signal may represent a full turn or fractions of a full turn of the item being measured (e.g. a rotor in an electric motor). In order to improve the signal quality and consequently the accuracy of the sensor system, a second signal is introduced, which is again sinusoidal in format, but phase shifted by a quarter of one phase, or 90 electrical degrees. While the first signal is typically designated as Sine-signal, the second signal is typically designated as Cosine signal. Such types of position sensor include, but are not limited to magnetic sensors, such as Hall, AMR (anisotropic magneto resistance), TMR (tunneling magneto resistance) or GMR (giant magneto resistance) sensors as well as inductive or eddy current sensors.

FIG. 1A illustrates a block diagram of a position sensor 100. As illustrated in FIG. 1A, position sensor 100 includes a transmitter coil 104 and receiver coils 106 coupled to a controller 102. Controller 102 drives transmitter coil 104 to generate a time-varying magnetic field, which induces eddy currents in a conductive target that is in a position relative to transmitter coil 104 and receiver coils 106. Receiver coils 106 are positioned within transmitter coil 104 and provides a signal related to the spatial superposition of magnetic fields generated by the transmitter coil and the magnetic fields generated by the eddy currents induced in the conductive target positioned over the receiver coils 106. In general, transmitter coil 104 and receiver coils 106 can be arranged to provide sensors of varying geometry, including linear and rotational positioning.

FIGS. 1B and 1C illustrate a planar view and a cross-sectional view of a rotational inductive position sensor. FIG. 1B illustrates position sensor coils 110. Position sensors coils 110 includes transmitter coil 104 and receiver coils 106 formed on a printed circuit board 112. As is illustrated in FIG. 1B, position sensor coils 110 are formed in a circular fashion. Transmitter coil 104 is formed in a circle around receiver coils 106. Receiver coils 106 can typically be two coils, a sine-coil that generates a sine signal as a target is rotated over receiver coils 106 and a cosine-coil that generates a cosine signal as the target is rotated over receiver coils 106. Leads 118 provide electrical connections between transmitter coil 104 and receiver coils 106 and controller 102 as illustrated in FIG. 1A.

FIG. 1C further illustrates operation of position sensor 100 using position sensor coils 110. As shown in FIG. 1C, transmitter coils 104 and receiver coils 106 are formed on PCB 112. Transmitter coils 104 and receiver coils 106 can be formed on both sides of PCB 112. A circular hole 108 is formed in the center of position sensor coils 110 through which a rotor shaft 114 can pass. A target 116, which is positioned to rotate over receiver coils 106, is coupled to rotor shaft 114.

FIG. 2A illustrates a graph of raw output signals from a position sensor 100 as illustrated in FIGS. 1A, 1B, and 1C. In this example, receiver coils 106 include a sine coil and a cosine coil. In FIG. 2A, the horizontal axis of the graph represents the mechanical rotation (in this case 0-360 degrees), the vertical axis of the graph shows the output voltages from the sine coil and the cosine coil of receiver coils 106. As the target is rotated over receiver coils through the full rotation, the sine coil provides a voltage given by:

$$V_{sine} = A \sin(\alpha),$$

where A is the amplitude of the signal and a is the angular position. Similarly, the sine coil of the receiver coils 106 provides a voltage given by:

$$V_{cosine} = B \cos(\alpha),$$

where B is the amplitude of the cosine coils of receiver coils 106 as target 116 is rotated. In the example illustrated in FIG. 2A, the amplitude of the cosine signal B is slightly larger than the amplitude of the sine signal A. The angle α can be designated in degrees or radians. In an ideal environment, the amplitudes of the sine signal and the cosine signal would be the same (A=B).

Having a sine and cosine signal that result from sine coils and cosine coils 106 available to provide position information simplifies the calculation of the actual absolute position of target 116, which is the position of rotor 114. In particular, the position being measured uses a simple arctangent function:

$$\text{Position} = \arctan\left(\frac{a_{sin} * \sin(x)}{a_{cos} * \cos(x)}\right) \rightarrow \text{Position} = \arctan\left(\frac{\sin(x)}{\cos(x)}\right) \text{ in radians}$$

$$\text{Position} = \arctan\left(\frac{a_{sin} * \sin(\alpha)}{a_{cos} * \cos(\alpha)}\right) * \frac{180}{\pi} \rightarrow \text{Position} = \arctan\left(\frac{\sin(\alpha)}{\cos(\alpha)}\right) \text{ in degrees}$$

where: $a_{sin}$: peak amplitude of sine signal,
$a_{cos}$: peak amplitude of cosine signal,
x: angular position in radians (0 . . . 2π), and
α: angular position in degrees (0 . . . 360).

The division of V sin/V cos eliminates the absolute level of the signal and thus provides a ratiometric measurement of sine divided by cosine, which is equal to the tangent of the angular position: tan(x)=sin(x)/cos(x). Consequently, the arctangent of sin(x)/cos (x) provides the angle (x): x=arctan (tan(x))=arctan(sin(x)/cos(x)).

Figure 2B:
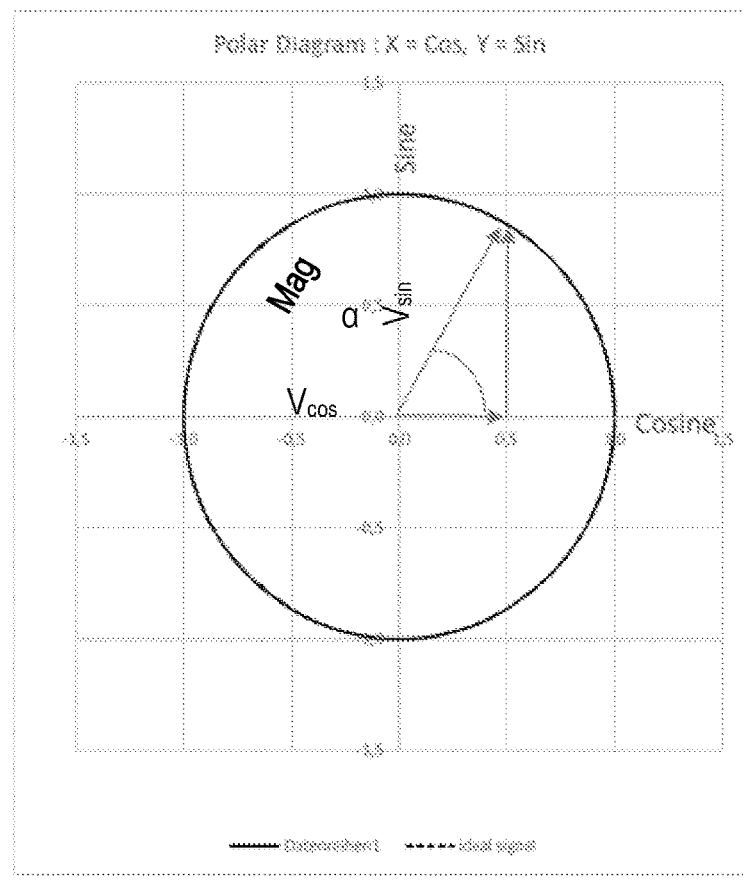
FIG. 2B illustrates a polar graph of an error-free sine and cosine signal.

FIG. 2B illustrates another depiction, a polar coordinate system, of the sine and cosine output signals from receiver coils 106. Another important parameter of the sensor system is the magnitude of the these signals, represented above as A and B. These magnitudes are representative of the signal level strength. In a polar coordinate system as shown in FIG. 2B, the X-axis is represented by the cosine signal $V_{cos}$ and the Y-axis is represented by the sine signal $V_{sin}$. The value α in this graph depicts the angular vector of the signal, which is the rotational position of target 116 to be measured. The Magnitude ("MAG") is the length of the vector, the peak level of the signals. In an error-free system, having undistorted sine and cosine signal (A=B), no offset, matching peak amplitude levels and exactly 90° phase shift between the sine and cosine functions, the magnitude is calculated in a simplified form as:

$$MAG = \sqrt{V_{\sin}^2 + V_{\cos}^2} = \sqrt{(A\sin(\alpha))^2 + (A\cos(\alpha))^2} = A,$$

where the magnitude (MAG)=the Magnitude level of the sine and cosine signals, α=the Angular position (in degrees, 0°≤α<360°), and A is the amplitude of the sine function and the cosine function. In the polar coordinate example illustrated in FIG. 2B, A=B=1.

The polar representation of such signals, as shown in FIG. 2B, which shows peak levels on sine and cosine signals, is a perfect circle, centered around the zero position, at the crossing of the X and Y axis. The cosine signal $V_{cos}$=cos(α) is plotted on the horizontal axis X and the sine signal $V_{sin}$=sin(α) is plotted on the vertical axis Y. Peak amplitude A for sine and A for the cosine signal is assumed to be 1 in the graphical representation depicted in the ideal situation illustrated in FIG. 2B. The magnitude vector has a constant length across the full circle, and the positional error (i.e., the difference between the calculated position of the target and its actual position) over the full 360° range is zero.

Figure 2C:
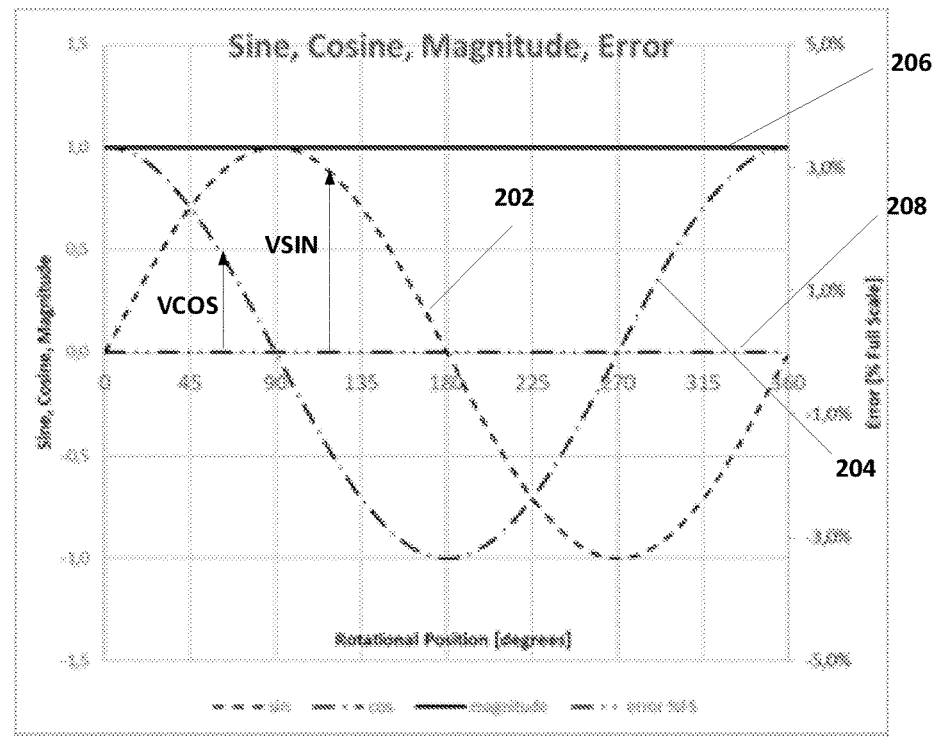
FIG. 2C illustrates rectangular coordinates of an error-free sine and cosine signal.

FIG. 2C illustrates the sine and cosine signals for an error free set of coordinates with magnitude 1. FIG. 2C illustrates the ideal situation where the sine signal 202 represented as $V_{sin}(\alpha)$ and the cosine signal 204 represented by $V_{cos}(\alpha)$ with a resulting signal magnitude (MAG) 206 of 1 through all angles. This results in a full-scale (FS) percent error 208 of 0 through all angles.

In practice, the signal path (raw signals→analog processing→digital processing→accurate position) may contain errors. These can be categorized into (1) Offset errors: one or both signals are shifted in the voltage domain in either the positive or negative direction; (2) Gain mismatch errors: different gains of sine and cosine signal path resulting in a mismatch of the amplitudes; and (3) Phase errors resulting in a phase shift between sine signal and cosine signal that is not 90°. In a system having such errors, the magnitude vector length is no longer a constant value throughout one period. However, as is further illustrated below, these errors represent distinctive patterns over one period, based on the type of error. Embodiments of the present invention analyze the pattern of the magnitude vector length within a minimum of half a period of rotation, ideally one full period of rotation, and provides evidence about the type of errors and the size of the error in that system. This data can be used to correct the processing so that more accurate positional determinations can be made.

In a typical rotating position sensor system 100, the input signals (sine and cosine signals) are constantly monitored and the angular position is calculated using the arctangent of the ratio of the sine and cosine signals as described above. In some embodiments, other appropriate methods, such as a look-up table, can be used. Likewise, the Magnitude of the signals using the square root of the square sum of sine and cosine signals, as described earlier is calculated. By monitoring the minimum and maximum signal levels (peak-to-peak magnitude) as well as the number of periods of that signal within one electrical period, the type of error along with the strength of that error can be estimated by the methods described further in this document.

The magnitude of a system 100 having offset, gain mismatch and phase errors is calculated as:

$$MAG = \sqrt{V_{\sin}^2(\alpha) + V_{\cos}^2(\alpha)} = \sqrt{[\delta_{sin} + a_{sin}\sin(\alpha)]^2 + [\delta_{cos} + a_{cos}\cos(\alpha + \varphi)]^2}$$

where MAG is the magnitude of a signal including offset, amplitude mismatch and phase errors, such as that depicted in the polar coordinate system illustrated in FIG. 2B. In the above equation. $\delta_{sin}$ is the offset level on the sine signal, $\delta_{cos}$ is the offset level on the cosine signal, $a_{sin}$ is the amplitude level of the sine signal, $a_{cos}$ is the amplitude of the cosine signal, α is the angular position (0°≤α≤360°), and φ is the phase error (difference from 90°) of the cosine signal relative to the sine signal.

Figure 3:
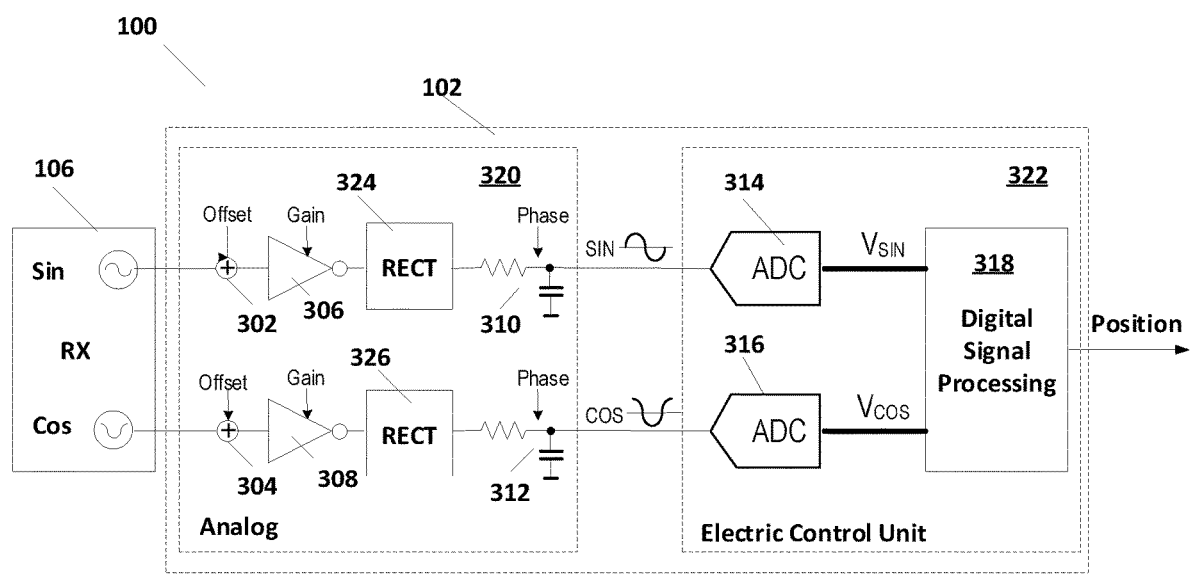
FIG. 3 illustrates a signal path of a position sensor system having sine and cosine signals.

FIG. 3 shows a signal path diagram for system 100. As is illustrated in FIG. 3, the sine signal and the cosine signal from position sensor receiver coils 106 is input to an analog circuit 320 and then to a digital electric control unit (ECU) 322. Consequently, the raw sine and cosine signals from the position sensor receiver coils 106 is amplified, rectified, and filtered in analog section 320 before being sent to the receiving electrical control unit 322, where the signals are converted to the digital domain and further processed. As illustrated in FIG. 3, the sine signal is input to an offset adder 302 where an AC offset voltage is added. The signal from offset adder 302 is then amplified in amplifier 306, rectified in rectifier 324, and filtered in filter 310. As a result, an offset, an amplitude gain, and a phase are introduced to the rectified signal. Similarly, the cosine signal is input to an offset adder 304 where an offset voltage is added, an amplifier 308 that amplifies the signal, a rectifier 326, and a filter 312 that filters the signal. Rectifiers 324 and 326 rectify the signals from amplifiers 306 and 308, respectively, and output signals with DC average values proportional (x 2/π) to the amplitudes of the amplified sign and cosine receiver voltages, respectively. The remaining high frequency component of the signals is removed by filters 310 and 312, respectively. The amplified and filtered sine signal and cosine signal are then input to ECU 322. In ECU 322, the sine signal is digitized in analog-to-digital converter (ADC) 314 to obtain a digitized signal $V_{sin}$ and input to digital signal processing 318. Similarly, the cosine signal is input to ADC 316 to obtain a digitized signal $V_{cos}$ and input to digital signal processing 318.

Digital signal processing 318 can include a microprocessor, memory (both volatile and non-volatile), and support circuitry sufficient to perform the functions as described here. Digital signal processing 318 receives the digitized signal $V_{sin}$ from ADC 314 and the digitized signal $V_{cos}$ from ADC 316 and determines the position of target 116, for example by an arctangent conversion as described above. The calculated position is then available at the output of the digital signal processor 322 in the form of digital data.

In accordance with embodiments of the present invention, digital signal processor 322 also determines the type and magnitude of the errors in the received signals $V_{sin}$ and $V_{cos}$ by analyzing characteristic patterns plotted over a period of the rotation. Depending on the type of error (offset, gain, or phase error) the magnitude and error curves, plotted over the full phase, show characteristic patterns, which allows a conclusion of the error type and the magnitude of the error from analysis of the magnitude over the angle pattern. While offset related errors lead to a 1-periodic error signal and a 1-periodic magnitude over one mechanical phase, gain and phase related errors lead to a 2-periodic error signal.

A major requirement in a sensor system such as sensor system 100 is the need for understanding the overall error of the sensor information provided by the signal chain in the sensor module (sensor raw data→analog signal processing→digital signal processing). An effective way to investigate the error of a sensor system is to compare the sensor results with a known good reference. However, for cost and handling reasons, this method is used only for product development and during end of line calibration in a production line, but is not used on every unit during normal operation. Another effective way is to use a redundant method, where two independent sensors are measuring the same physical parameter (e.g. rotary position) and the Electric Control Unit (ECU) compares the two sensor results. A deviation of the two sensor output signals is considered a failure of the system, but it might not reveal which sensor is defective and which one is operating correctly. Particularly in a high-speed rotary sensor systems, as for example in a rotor position sensor of an electric motor, the sensor signal cannot be interrupted during operation, therefore it is not allowed for example to replace the sensor raw signal with a known reference signal for making a reference measurement. Therefore, the error analysis must be performed with the un-interrupted sine and cosine signals.

Figure 4A:
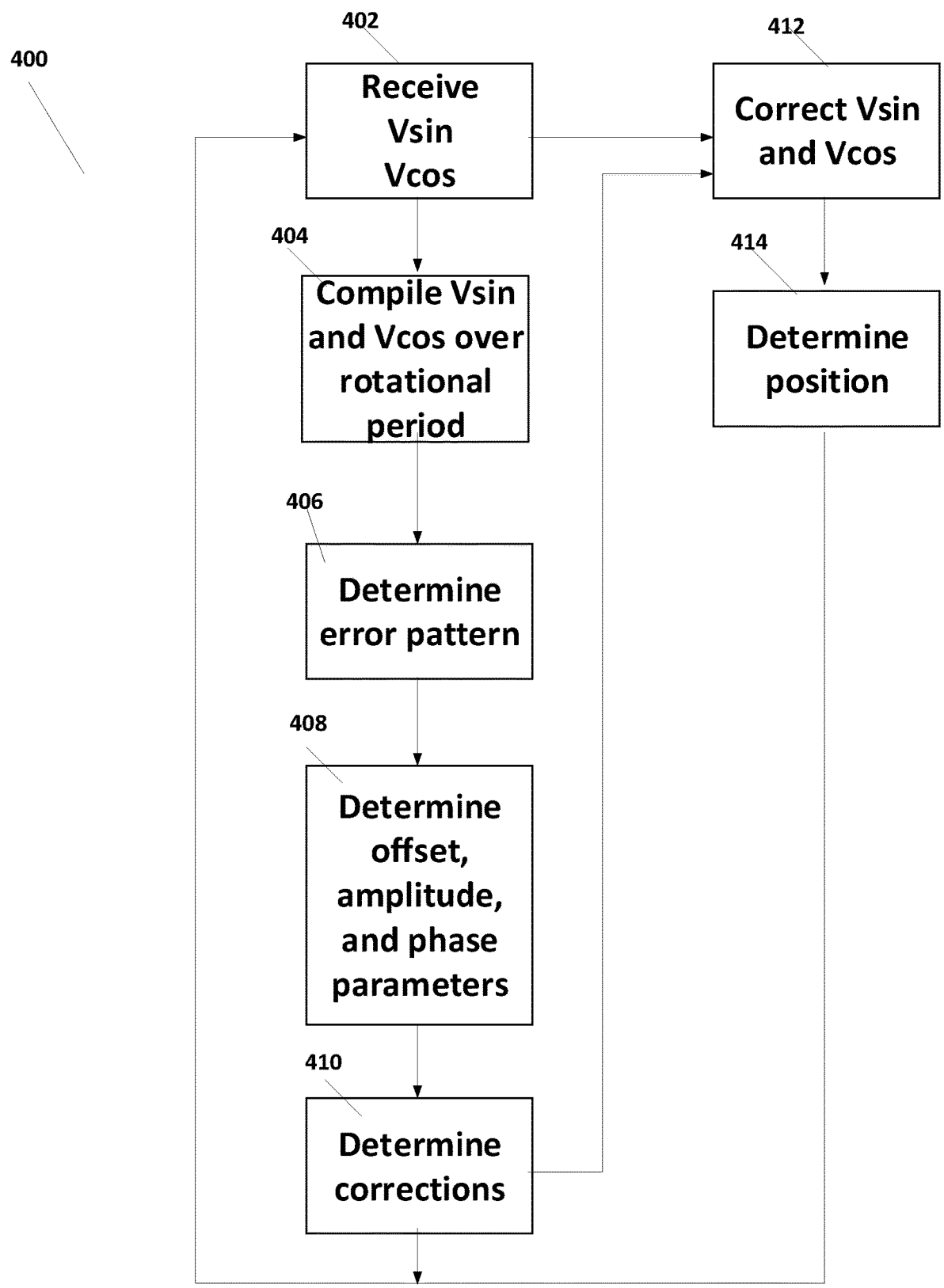
FIGS. 4A and 4B illustrate a process that can be executed on a processor of the position sensor system according to some embodiments.

FIG. 4A illustrates an example process 400 that can be executed on digital signal processing 318 as illustrated in FIG. 3. Process 400 receives the sine signal $V_{sin}$ and the cosine signal $V_{cos}$ in step 402. This occurs as shaft 114 is rotated such that target 116 is rotated over receiver coils 106. On each rotation of shaft 114, a number of data points will be received, depending on the relationship between the rotational frequency of shaft 114 and the internal operating clock that determines data sampling of digital signal processing 318. In step 404, the data is compiled such that all of the $V_{sin}$ and $V_{cos}$ data over a rotational period of shaft 114, for example data can be compiled over a full rotation period or over a number of full rotational periods to reduce the impact of noise by averaging, are stored. This compiled data can be continuously updated on each rotation of shaft 114, or can be updated every few rotations of the shaft.

In step 406, the error pattern is determined from the compiled $V_{sin}$ and $V_{cos}$. In step 408, the offset, amplitude, and phase parameters are determined based on the error pattern recognition and the magnitude of the errors determined. Steps 406 and 408 are further discussed below in further detail.

In step 410, corrections to the sine signal $V_{sin}$ and the cosine signal $V_{cos}$ can be determined. These corrections can be input to step 412. Step 412 receives the originally received sine signal $V_{sin}$ and cosine signal $V_{cos}$ and corrects these signals according to the corrections determined by step 410 to provide step 414 with corrected signals $V_{sin}$ and $V_{cos}$. In step 414, the position of target 116 over receiver coils 106 is determined.

The loop that includes steps 412 and 414 can be executed on each sampling cycle of the sine signal $V_{sin}$ and the cosine signal $V_{cos}$. Therefore, the position determination is accomplished on each sampled values $V_{sin}$ and $V_{cos}$. The loop of process 400 that includes steps 404 through 410 can be executed on each rotational period of shaft 114 (i.e., through each rotation through 360°) or on selected rotational periods of shaft 114.

In some embodiments, steps 406, 408, and 410 can be performed with a simple method that allows precise error determination from the sine and cosine signals $V_{sin}$ and $V_{cos}$ without the need of a reference sensor and likewise without the need of a second, redundant sensor. Some methods according to these embodiments are based on the observation that in a sensor system 100 having offset errors, either on one or on both sensor signals (sine and/or cosine), there is a fixed relation between the normalized ripple on the magnitude of the signals and the normalized, full scale peak-to-peak error over a full period of rotation. Likewise, in a sensor system 100 having gain and/or phase errors in the sensor signals (sine and/or cosine) there is the same fixed relation between the normalized ripple on the magnitude of the signal and the normalized peak-to-peak error over a full period.

Figure 4B:
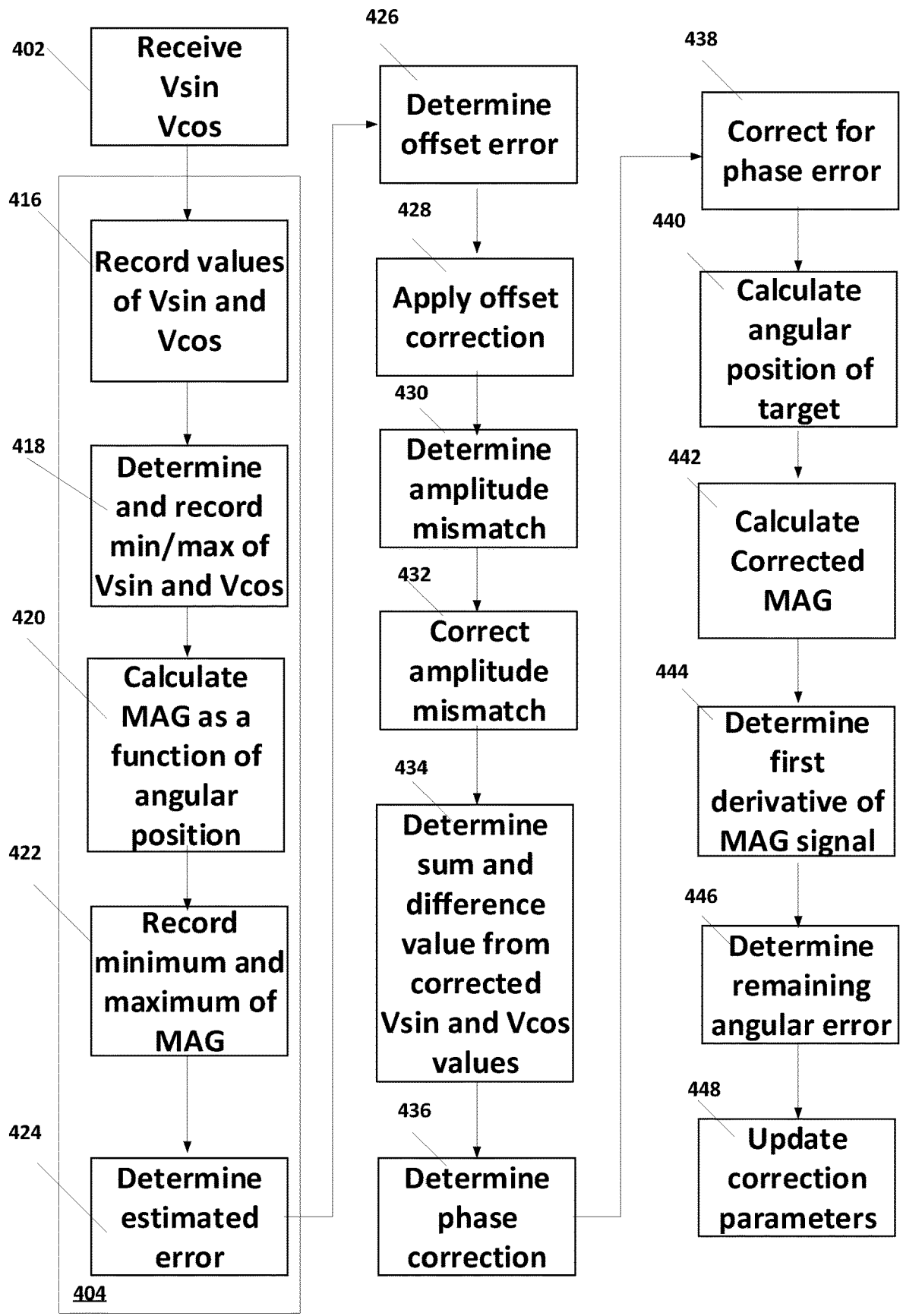

FIG. 4B illustrates a more detailed example of part of process 400, in particular steps 402-410 illustrated in FIG. 4B. As discussed above, in step 402 the sine signal $V_{sin}(\alpha)$ and the cosine signal $V_{cos}(\alpha)$ are received in digital signal processing 318. Data is then compiled over one or more rotational periods (rotations of a through 360°) are accumulated in step 404. Although in some embodiments all of the data points of $V_{sin}(\alpha)$ and $V_{cos}(\alpha)$ can be compiled and stored, in some embodiments data is extracted from the input signals $V_{sin}(\alpha)$ and $V_{cos}(\alpha)$ and stored instead.

As illustrated in FIG. 4B, compilation step 404 can simultaneously compile multiple derived data over the rotational period or periods of the data acquisition. In step 416, the signals $V_{sin}(\alpha)$ and $V_{cos}(\alpha)$ can be monitored and stored. The minimum and maximum values can be recorded over the rotational period or periods of the data acquisition in step 418.

In some embodiments, in step 420 the magnitude is recorded as a function of angle $MAG(\alpha)$. As discussed above, the magnitude can be calculated from the signals $V_{sin}(\alpha)$ and $V_{cos}(\alpha)$ as discussed above and is given by:

$$MAG(\alpha) = \sqrt{V_{sin}^2(\alpha) + V_{cos}^2(\alpha)}$$

In step 422, the maximum and minimum values of $MAG(\alpha)$ over the data acquisition period can be recorded. In step 404, some other values can be calculated and recorded for later use as well.

In step 424, an estimated error can be calculated from the maximum and minimum values of $MAG(\alpha)$. In that calculation, the normalized magnitude ripple can be defined as:

$$MAG_{norm} = \frac{MAG_{max} - MAG_{min}}{MAG_{max} + MAG_{min}}$$

where $MAG_{norm}$ is the normalized magnitude ripple of the sine and cosine signals over a full period and has a value between 0 and 1, $MAG_{min}$ is the minimum magnitude level of $MAG(\alpha)$ over a full period, and $MAG_{max}$ is the maximum magnitude level of $MAG(\alpha)$ over a full period. Consequently, $MAG_{norm}$ is determined by determining the minimum $MAG(\alpha)$, $MAG_{min}$, and the maximum $MAG(\alpha)$, $MAG_{max}$, over a full period of compiled data from step 416 and calculating the normalized magnitude ripple $MAG_{norm}$ as discussed above.

Additionally, a normalized error can be estimated from the $MAG_{norm}$. The normalized error $err_{norm}$, which is also the peak-to-peak value of $err(\alpha)$, can be defined as:

$$err_{norm} = \frac{err_{max} - err_{min}}{360°}$$

where $err_{norm}$ is the normalized full scale error over a full 360° rotation, $err_{min}$ is the minimum positional error in degrees over the full 360° rotation, and $err_{max}$ is the maximum positional error in degrees over the full 360° rotation. In some embodiments, $err_{min}$ can be considered to be 0. Table 1 below illustrates the position of extremes of of MAG(α) and err(α) patterns with various combinations of error resulting in offset, amplitude mismatch, and phase. These patterns are further discussed below with respect to various Figures. In particular, error case 1.1 illustrates a positive offset error on the sine signal, such as that illustrated in FIGS. 5A, 5B, and 5C. Error case 1.2 illustrates a negative offset on the sine signal, such as that illustrated in FIGS. 6A, 6B, and 6C. Error case 1.3 illustrates a positive offset on the cosine signal, such as that illustrated in FIGS. 7A, 7B, and 7C. Error case 1.4 illustrates a negative offset on the cosine signal such as that illustrated in FIGS. 8A, 8B, and 8C. Error case 1.5 illustrates a combination of offsets on the sine signal and the cosine signal as is illustrated in FIGS. 9A, 9B, and 9C. As indicated in Table 1, these offset errors illustrate patterns of MAG(α) and err(α) that are sinusoidal and repeat every period of rotation (1-periodic sinusoidal). The error pattern description and magnitude pattern description columns indicate the positional angle where the maximum and minimum values of err(α) and MAG(α) are found in the pattern. The last column provides the ratio of the magnitude ripple $MAG_{norm}$, and normalized error $err_{norm}$.

Figure 10A:
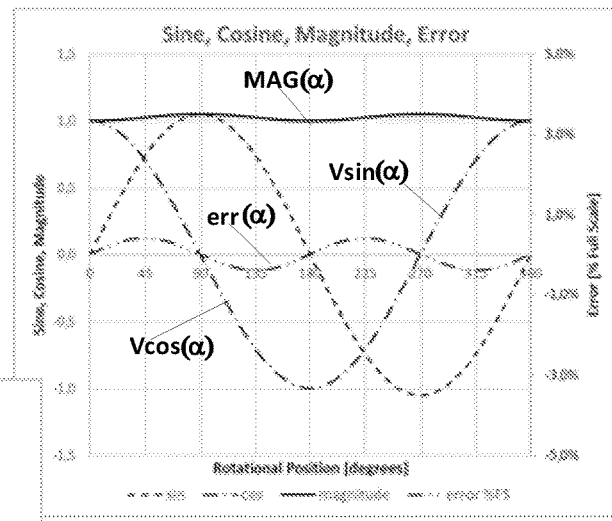
FIGS. 10A, 10B, and 10C illustrate an amplitude of the sine signal that is greater than the amplitude of the cosine signal.
Figure 10B:
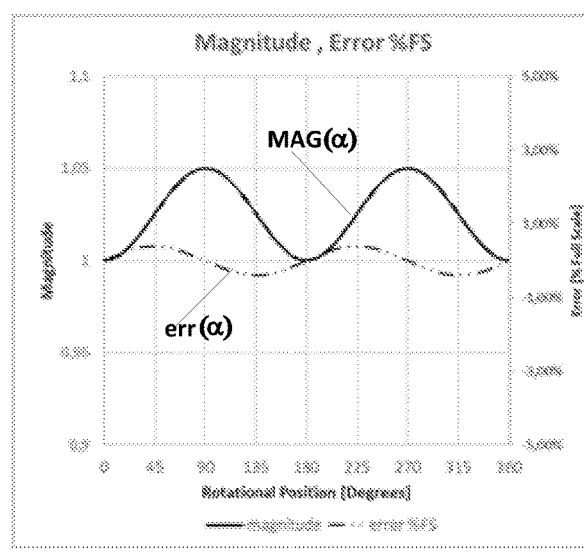
Figure 10C:
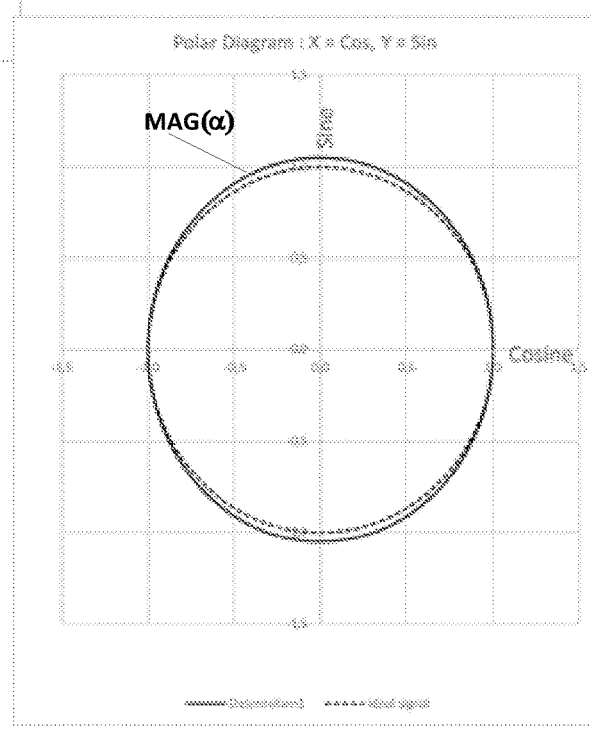
Figure 11A:
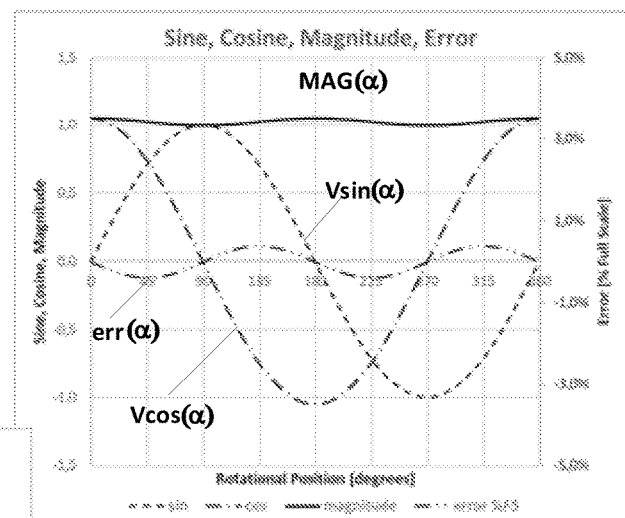
FIGS. 11A, 11B, and 11C illustrate an amplitude of the cosine signal that is greater than the amplitude of the sine signal.
Figure 11B:
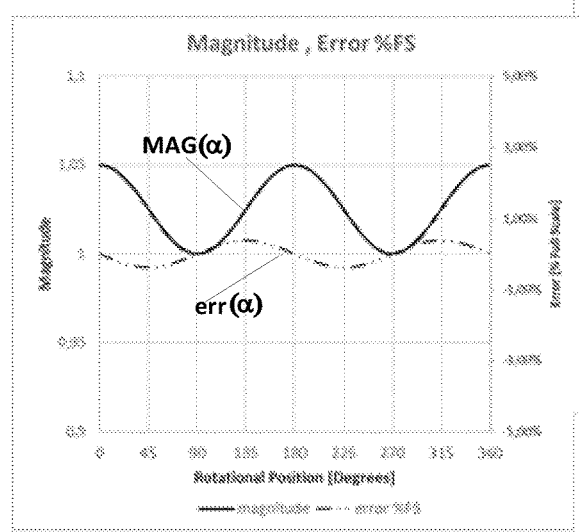
Figure 11C:
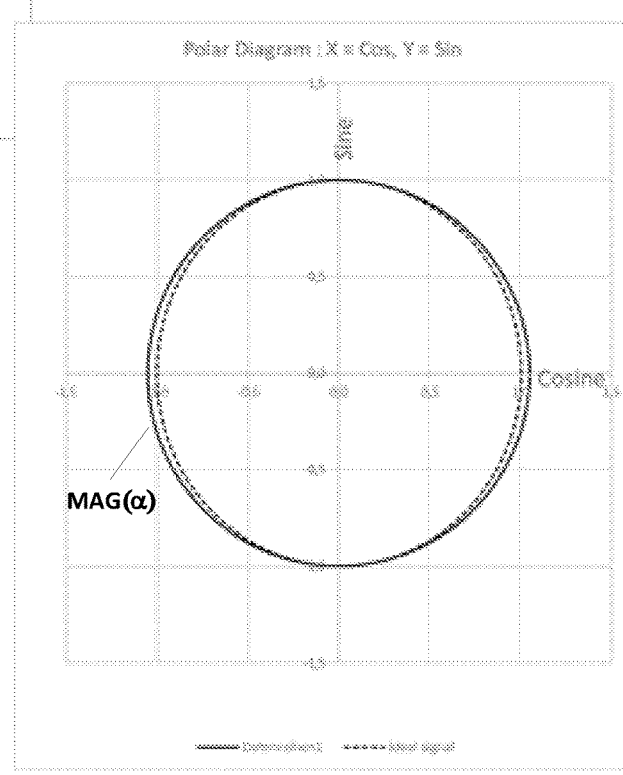
Figure 12A:
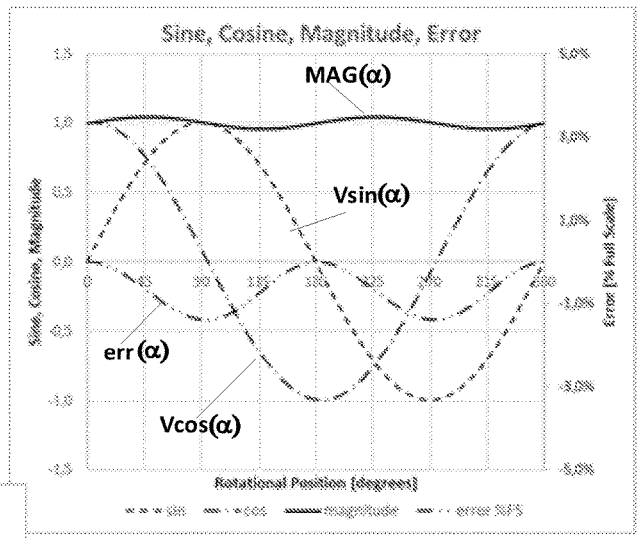
FIGS. 12A, 12B, and 12C illustrates a cosine to sine phase shift of less than 90 degrees.
Figure 12B:
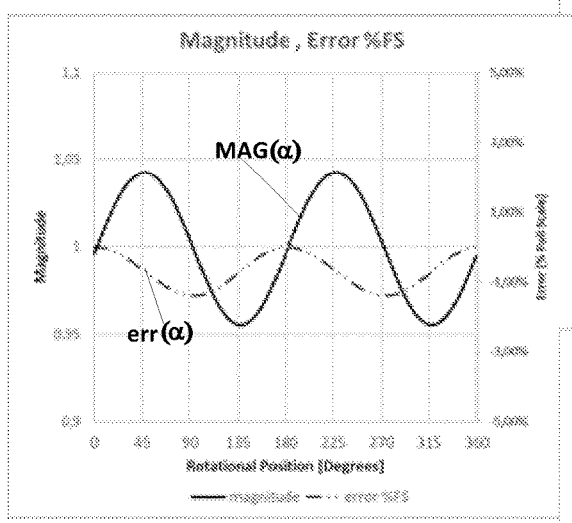
Figure 12C:
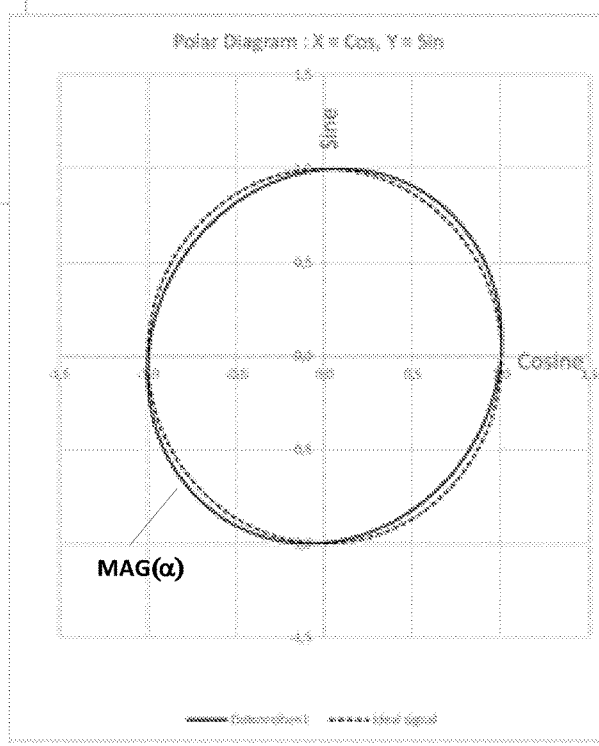

Error cases 2.1, 2.2, 3.1, 3.2, and 3.3 illustrate error cases where the patterns of MAG(α) and err(α) repeats twice every rotational period (2-periodic sinusoidal) (i.e., there are two maximum values and two minimum values of MAG(α) and err(α) for each rotational period). Error case 2.1 illustrates a case where the sine signal amplitude is greater than that of the cosine signal, which is illustrated in FIGS. 10A, 10B, and 10C. Error case 2.2 illustrates a case where the amplitude of the cosine signal is greater than that of the sine signal, which is illustrated in FIGS. 11A, 11B, and 11C. Error case 3.1 illustrates a case where the cosine signal phase shift from the sine signal is greater than 90°, which is illustrated in FIGS. 12A, 12B, and 12C. Error case 3.2 illustrates a case where the cosine signal phase shift from the sine signal is less than 90°, which is illustrated in FIGS. 13A, 13B, and 13C.

Figure 15A:
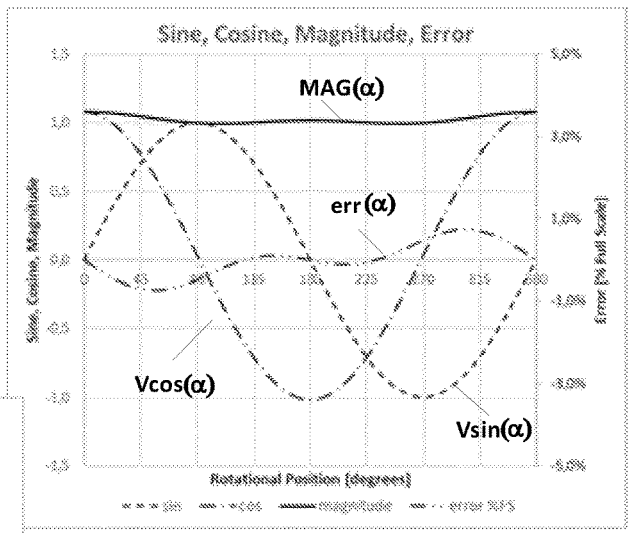
FIGS. 15A, 15B, and 15C illustrates a combination of offset and gain errors.
Figure 15B:
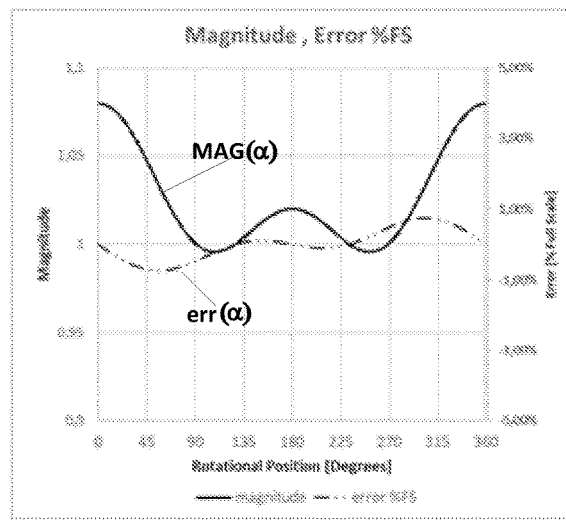
Figure 15C:
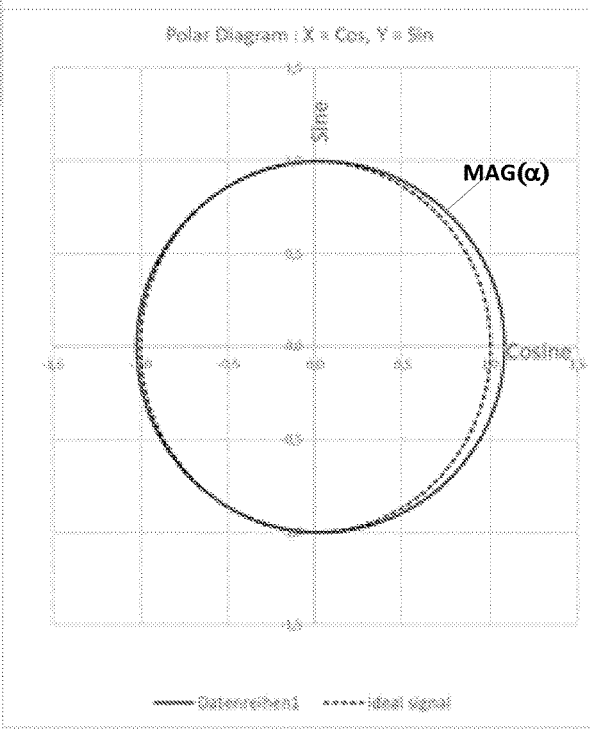
Figure 16A:
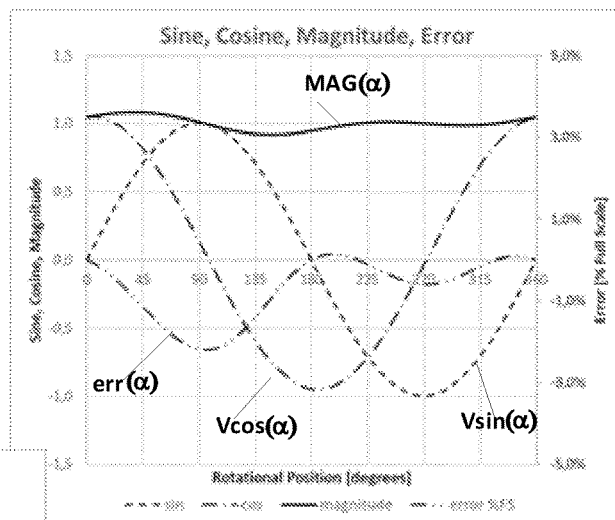
FIGS. 16A, 16B, and 16C illustrates a combination of offset and phase errors.
Figure 16B:
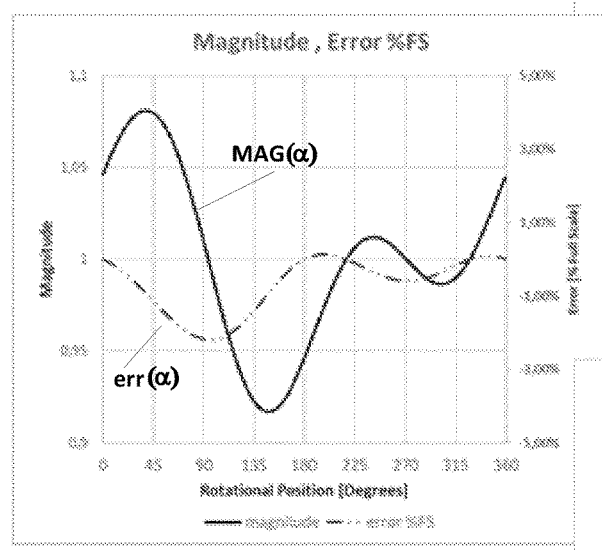
Figure 16C:
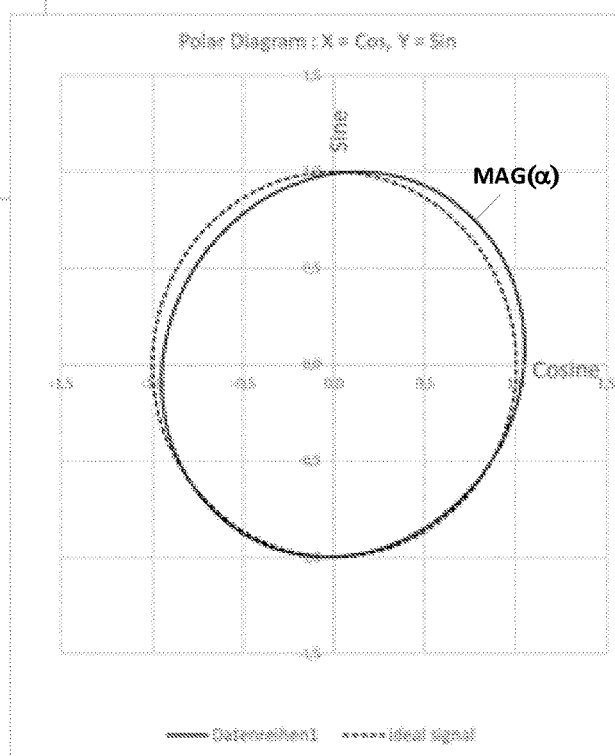
Figure 17A:
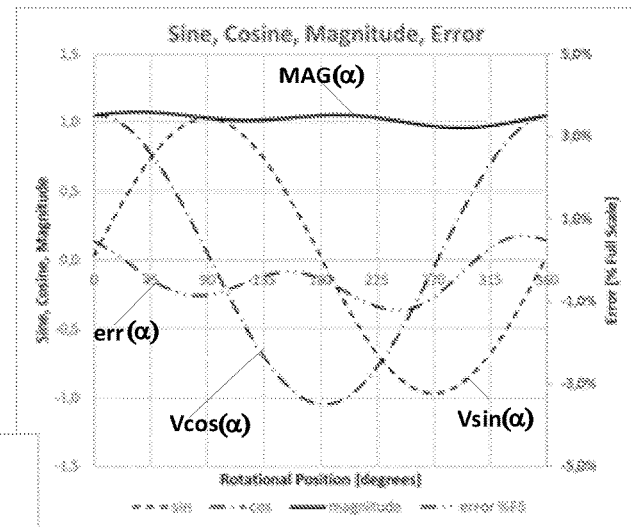
FIGS. 17A, 17B, and 17C illustrates a combination of offset, gain, and phase errors.
Figure 17B:
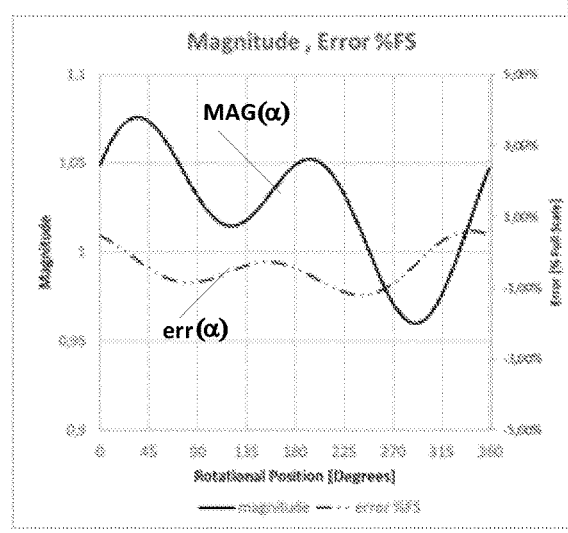
Figure 17C:
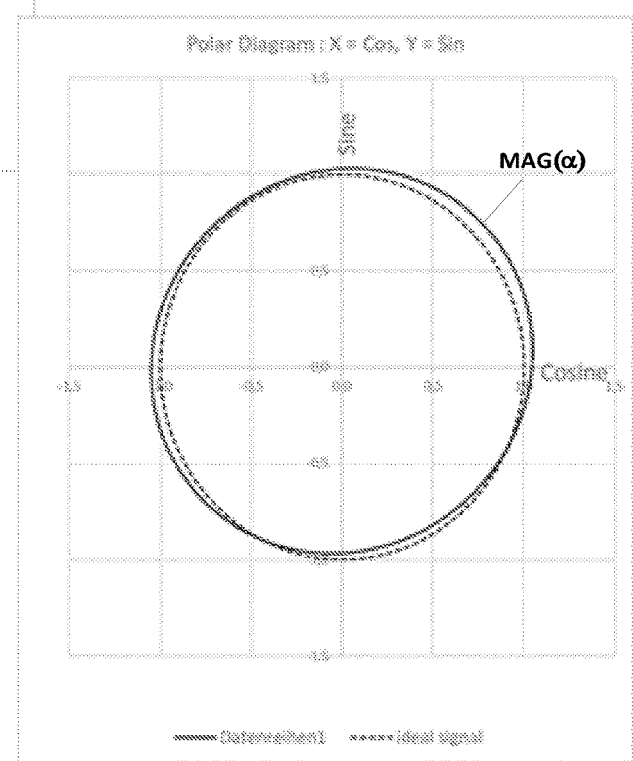

Error cases 4.1, 4.2, and 4.3 illustrate combinations of 1-periodic and 2-periodic patterned errors. Case 4.1 illustrates a combination of offset and gain errors, which is illustrated in FIGS. 15A, 15B, and 15C. Case 4.2 illustrates a combination of offset and phase errors, which is illustrated in FIGS. 16A, 16B, and 16C. Case 4.3 illustrates a combination of offset, gain, and phase errors, which is illustrated in FIGS. 17A, 17B, and 17C.

As shown in Table 1 (below), for any combination of 1-periodic errors (offset errors on sine and/or cosine signal), the ratio between normalized Magnitude and normalized error is a fixed factor of 3.14:1. Likewise, for any combination of 2-periodic errors (gain or phase errors on sine and/or cosine signal), the ratio between normalized Magnitude and normalized error is a fixed factor of 3.14:1. Another indicator is that the waveform of the error err(α) resembles the 1st derivative of the magnitude MAG(α). To determine the error of a rotating sensor system, the maximum and minimum magnitude levels over a full period can be constantly monitored and the magnitude ripple calculated from these two values or the first derivative of MAG(α) can be determined to provide the shape of err(α). Dividing the magnitude ripple by the fixed factor of 3.14 leads to an estimation of the maximum normalized error of the system.

TABLE 1

| Error case | Type of error | Magnitude and Error pattern | Position of Error pattern extremes | | Position of Magnitude pattern extremes | | Magnitude vs. error |
| --- | --- | --- | --- | --- | --- | --- | --- |
| | | | Max pos | Max neg | Max pos | Max neg | |
| 1.1 | Pos offset on Sin | 1-periodic sinusoidal | 0° | 180° | 90° | 270° | 3.14x |
| 1.2 | Neg. offset on Sin | | 180° | 0° | 270° | 90° | 3.14x |
| 1.3 | Pos. offset on Cos | | 270° | 90° | 0° | 180° | 3.14x |
| 1.4 | Neg. offset on Cos | | 90° | 270° | 180° | 0° | 3.14x |
| 1.5 | Combinations of 1.1 to 1.4 offset errors | | Variable | | Variable | | 3.14x |
| 2.1 | Amplitude Sin > Cos | 2-periodic sinusoidal | 45°, 225° | 135°, 315° | 90°, 270° | 0°, 180° | 3.14x |
| 2.2 | Amplitude Cos > Sin | | 135°, 315° | 45°, 225° | 0°, 180° | 90°, 270° | 3.14x |
| 3.1 | Cos phase shift <90° | | 0°, 180° | 90°, 270° | 45°, 225° | 135°, 315° | 3.14x |
| 3.2 | Cos phase shift >90° | | 90°, 270° | 0°, 180° | 135°, 315° | 45°, 225° | 3.14x |
| 3.3 | Combinations of gain and phase errors | | Variable | | Variable | | 3.14x |
| 4.1 | Combinations of offset and gain errors | | Combination of 1- and 2- periodic pattern, depending on error type | | Combination of 1- and 2- periodic pattern, depending on error type | | Variable |
| 4.2 | Combinations of offset and phase errors | | Combination of 1- and 2- periodic pattern, depending on error type | | Combination of 1- and 2- periodic pattern, depending on error type | | Variable |
| 4.3 | Combinations of offset, gain and phase errors | | Combination of 1- and 2- periodic pattern, depending on error type | | Combination of 1-and 2- periodic pattern, depending on error type | | Variable |

It should be noted that this ratio of 3.14:1 is maintained only if the type or error is either 1-periodic (from offset errors) or 2-periodic (from gain or phase errors). Combinations of 1-periodic (offset) and 2-periodic (gain or phase) errors lead to non-sinusoidal magnitude and error patterns where there is no fixed ratio between magnitude ripple and maximum error. The ratio will be in a similar region (depending on the type of error), but not exactly 3.14:1. Therefore, in such cases, the magnitude ripple can still be used to determine the error over a full turn, but with less precision. This method also requires that the investigated sensor system is physically rotated by at least a movement that provides half of an electrical period. In practice, especially in constantly rotating systems, a full electrical period will be used as it simplifies the data collection to picking the maximum and minimum magnitude level.

The calculated error determined in step 424 as described above, is the maximum peak-to-peak error within one electrical period, it cannot be used to calculate the error at a given static position. However, since the error pattern resembles the $1^{st}$ derivative of the magnitude waveform, the error at any position can be calculated from the $1^{st}$ derivate of the magnitude signal. This could be performed by monitoring not only the maximum and minimum values of the magnitude but also by constantly measuring the magnitude level and calculating the rate of change through the delta of the magnitude over a given change of position in a moving system.

Further to the error monitoring based on the pattern of the magnitude signal, the analysis of the sine and cosine signals in a rotating position sensor system also provides inputs that allow an elimination of offset, amplitude mismatch, and phase errors.

In some embodiments, steps 420, 422, and 424 may be omitted so that the magnitude and error are not calculated using the uncorrected input data $V_{sin}(\alpha)$ and $V_{cos}(\alpha)$. Instead, these calculations may be performed using corrected data so that the resulting error reflects the remaining error after corrections are made, as suggested in steps 442-446 discussed below.

In step 426 of FIG. 4B, the offset errors can be determined. By constantly monitoring the sine and cosine input signals $V_{sin}(\alpha)$ and $V_{cos}(\alpha)$, the peak levels of each signals are recorded and analyzed as discussed above in step 420. In step 426, the offset of the sine signal can be calculated over 1 period of the maximum and minimum values of $V_{sin}(\alpha)$ and $V_{cos}(\alpha)$ determined in step 418 as:

$$Offset_{SIN} = \frac{VSIN_{max} + VSIN_{min}}{2} - V_{REF}.$$

The offset of the cosine signal is similarly calculated as:

$$Offset_{cos} = \frac{vcos_{max} + vcos_{min}}{2} - V_{REF}$$

In these equations, $Offset_{SIN}$ is the offset on the sine signal $V_{sin}(\alpha)$, $Offset_{COS}$ is the offset on the cosine signal $V_{cos}(\alpha)$, $VSIN_{max}$ is the maximum signal level of the sine signal $V_{sin}(\alpha)$ over a full period of rotational motion, $VSIN_{min}$ is the minimum signal level of the sine signal $V_{sin}(\alpha)$ over a full period of rotational motion, $VCOS_{max}$ is the maximum signal level of the cosine signal $V_{cos}(\alpha)$ over a full period of rotational motion, $VCOS_{min}$ is the minimum signal level of the cosine signal $V_{cos}(\alpha)$ over a full period of rotational motion, and VREF is a reference bias point of the sine and cosine signals.

In step 428, the calculated $Offset_{SIN}$ can be subtracted from the sine signal $V_{sin}(\alpha)$ to obtain an offset-free sine signal. Similarly, the calculated $Offset_{COS}$ can be subtracted from the cosine signal $V_{cos}(\alpha)$ to obtain an offset-free cosine signal. The corrected values of $V_{sin}(\alpha)$ and $V_{cos}(\alpha)$ can replace the values recorded in step 416. Consequently, the values of $Offset_{SIN}$ and $Offset_{COS}$ can be provided to step 412 to use to correct the sine and cosine signals during operation.

In step 430, the amplitude mismatch can be determined. By constantly monitoring the sine and cosine input signals and recording the peak levels, as described above in step 420. The amplitude mismatch of sine and cosine signals is then calculated as:

$$Amplitude\_mismatch = \frac{VSIN_{max} - VSIN_{min}}{VCOS_{max} - VCOS_{min}}.$$

In this equation, the Amplitude_mismatch is the mismatch of sine and cosine signal levels where a value of 1 represents an ideal matching, VSINmax is the maximum signal level of the sine signal $V_{sin}(\alpha)$, VSINmin is the minimum signal level of the sine signal $V_{sin}(\alpha)$, VCOSmax is the maximum signal level of the cosine signal $V_{cos}(\alpha)$, and VCOSmin is the minimum signal level of the cosine signal $V_{cos}(\alpha)$. By multiplying $V_{cos}(\alpha)$ by the calculated Amplitude_mismatch value, both the sine signals and the cosine signals will have the same amplitude levels. Note that the amplitude correction can be performed whether or not new minimum and maximum values are corrected based on the offset-corrected sine and cosine values.

Consequently, in step 432, the signals $V_{sin}(\alpha)$ and $V_{cos}(\alpha)$ can be corrected by multiplying the cosine signal $V_{cos}(\alpha)$ by the Amplitude_mismatch. Again, in some embodiments, the recorded values of $V_{sin}(\alpha)$ and $V_{cos}(\alpha)$ can be replaced. At this point, the recorded values of $V_{sin}(\alpha)$ and $V_{cos}(\alpha)$ have been corrected for offset and for amplitude mismatch.

In steps 434 through 438, the phase correction is determined. As illustrated in the ideal situation shown in FIG. 2C, an ideal phase shift of 90° between sine and cosine signals is indicated by one signal crossing the vertical zero line while the opposite signal has either a minimum or a maximum at this position. In the case of a phase error between the sine and cosine signal ($V_{sin}(\alpha)$ and $V_{cos}(\alpha)$), the zero-signal crossings no longer occur at one of the peaks of the opposite signal.

A simple method to correct phase errors has been described in patent application publication US20130268234A1 "Method and device for determining the absolute position of a movable body," by a co-author if this application. As described therein, to correct a phase error, two new signals are generated, derived from the sum and the difference of the sine and cosine signals. The sum and the difference of a sine and cosine signal are always phase shifted by 90° independent of the initial phase shift error between the sine and cosine signal (except for 0° and 180° phase shifts where the difference or the sum becomes 0). After the sum and difference calculation, an initial phase shift error between the sine and cosine signals is represented as an amplitude mismatch of the sum and difference signals, which in a subsequent step can be corrected by the same method described for amplitude mismatch correction, or a phase correction can be determined.

In step 434, the sum and difference signals can be determined based on the corrected values of $V_{sin}(\alpha)$ and $V_{cos}(\alpha)$. As such, the value of Sum($\alpha$) can be calculated as $V_{sin}(\alpha)+V_{cos}(\alpha)$. The value of Diff($\alpha$) can be determined as $V_{sin}(\alpha)-V_{cos}(\alpha)$. As discussed above, adding or subtracting sinusoidal waves of the same frequency but with a phase shift between them yields a sinusoidal wave of the same frequency, but different amplitude and phase relationships. As discussed above, the sum and the difference of two sinusoidal waves are phase shifted by 90° to each other, no matter what the phase shift of the original signals was (except for the special case of phase shifts of 0° and 180° where the sum or difference becomes 0). If both of the signals $V_{sin}(\alpha)$ and $V_{cos}(\alpha)$ have the same amplitude, but a phase relation different from 90°, this phase differences results in an amplitude mismatch between the sum and difference signals. This amplitude mismatch can easily be compensated by measuring the extremes of both signals (sum and difference) to obtain $Sum_{max}$, $Sum_{min}$, $Diff_{max}$, and $Diff_{min}$ and adjusting the amplitudes as discussed above with respect to the amplitude adjustment. Based on ideal original signals with a 90° phase relation and identical amplitudes, the sum and difference signals Sum(a) and Diff(a) are phase shifted by 45° relative to the original signals $V_{sin}(\alpha)$ and $V_{cos}(\alpha)$. Consequently, the position $\alpha$ can be calculated from the amplitude adjusted values of Sum($\alpha$) and Diff($\alpha$) while taking the positional phase shift of 45° into account by $$\text{position} = \arctan\left(\frac{Diff}{Sum}\right).$$

In this case, the position of target 116 can be determined accurately while the phase correction is further taken into account. In these embodiments, from step 434, the system proceeds to step 440 where the sum and difference values are then sued to calculate the angular position of target 116.

In some embodiments, step 434 proceeds to step 436, where the maximum and minimum values of Sum($\alpha$) and Diff($\alpha$), $Sum_{max}$, $Sum_{min}$, $Diff_{max}$, and $Diff_{min}$ can be normalized. As discussed above, the sum and difference values can be normalized as:

$$Sum_{norm} = \frac{Sum_{max} - Sum_{min}}{Sum_{max} + Sum_{min}},$$

$$Diff_{norm} = \frac{Diff_{max} - Diff_{min}}{Diff_{max} + Diff_{min}}.$$

In these equations, $Sum_{norm}$ is the normalized sum values, $Sum_{max}$ is the maximum sum value as determined in step 418, $Sum_{min}$ is the minimum sum value as determined in step 418, $Diff_{norm}$ is the normalized difference value, $Diff_{max}$ is the maximum difference value as determined in step 418, and $Diff_{min}$ is the minimum difference value as determined in step 434.

In step 436, the phase difference of the cosine signal relative to 90° from the sine signal, $\alpha$, can then be given by:

$$\varphi = 2\arctan\left(\frac{Diff_{norm}}{Sum_{norm}}\right).$$

Consequently, in step 438, the sine and cosine signals can be corrected for phase differences based on the phase difference calculated in step 436. In step 440, the angular position can be calculated using the corrected values of $V_{sin}(\alpha)$ and $V_{cos}(\alpha)$ as described above, these values being corrected for the offset values $Offset_{sin}$ and $Offset_{cos}$, the amplitude mismatch, and the phase difference $\varphi$. As discussed above, in some embodiments step 440 uses the amplitude adjusted sum and difference values that uses $V_{sin}(\alpha)$ and $V_{cos}(\alpha)$ that have been corrected for the offset values $Offset_{sin}$ and $Offset_{cos}$ and the amplitude mismatch to directly calculate the position of target 116. In step 446, these correction parameters can be updated to step 412, for continuous correction of the sine and cosine signals to provide a rotational position in step 414. In some embodiments, the offset correction values, amplitude correction values, and phase correction can be updated while in other embodiments the offset correction values, amplitude correction values, and Sum/Diff amplitude correction values can be uploaded.

In steps 444 and 446, the remaining angular position error can be calculated. In step 442, the values of MAG($\alpha$) can be calculated using the corrected values of $V_{sin}(\alpha)$ and $V_{cos}(\alpha)$ as discussed above. The first derivative of the corrected MAG signal can then be determined. In some embodiments, the first derivative of MAG($\alpha$) can be determined by monitoring its change as a function of positional angle through a particular range of positional angles. The first derivative of MAG($\alpha$) is indicative of the shape of the error err($\alpha$) and the peak-peak value of err($\alpha$) is related to the magnitude ripple value as discussed above. Alternatively, the MAG signals stored in step 420 can be calculated The magnitude pattern and the first derivative with respect to angular position over a half or full period can be analyzed to determine the remaining error as described above.

Therefore, a dynamic signal correction according to the present invention, and as described with FIGS. 4A and 4B, may consist of the following actions. The method steps as described in FIGS. 4A and 4B may occur in any order, and may be executing simultaneously. Therefore, embodiments of the present invention can include (1) constantly monitor sine and cosine input signals while the position sensor system is rotating as described in step 404; (2) Record the minimum and maximum levels of the sine and cosine signals as described in step 416; (3) Determine the correct offset errors as described above with respect to step 426; (4) Apply offset correction to both sine and cosine signals as illustrated in step 428; (5) Correct amplitude mismatch as described above in step 430; (6) Apply the amplitude mismatch correction as described in step 432; (7) Apply phase correction described above, which includes calculating sum and difference of sine and cosine signals as described in step 418 and using amplitude adjusted sum and difference values to directly calculate the position or by normalizing the sum and difference values to calculate the phase difference as described in step 436 and 438; (8) Calculate the angular position, by means of arctangent or other methods as discussed with step 440 and step 414; (9) Calculate the magnitude of the sine and cosine signals by the square root of the square sums of sine and cosine signals as discussed in steps 442; (10) Record the minimum and maximum magnitude values along with their number of periods within one electrical period as described in step 442; (11) Determine the first derivative of the magnitude signal by monitoring the change with position within a fixed rotational window as illustrated in step 444 of FIG. 4B; and (12) Determine the remaining angular error by analyzing the magnitude pattern and rate of change over a half or full period as described in this document as described in step 446.

As is illustrated in FIGS. 4A and 4B, the correction of the sine and cosine signals and the calculation of the angular position can be performed throughout the process or, as illustrated in FIG. 4A, as a separate step. In some embodiments, during calculation of the phase correction in step 434, sine and cosine data that has been corrected for offsets and amplitude variation can be used. In those embodiments, the sine and cosine data itself is recorded in step 404 and the sum and difference signals are calculated during step 434.

Calculation of the correction values as described in FIGS. 4A and 4B can be performed continuously while system 100 is operating. Alternatively, the process described in FIGS.

4A and 4B can be performed periodically and the correction parameters updated accordingly. In steps 412 and 414, the latest updated correction parameters can then be used to continuously correct the values of $V_{sin}(\alpha)$ and $V_{cos}(\alpha)$ received in digital signal processing 318.

Figure 5A:
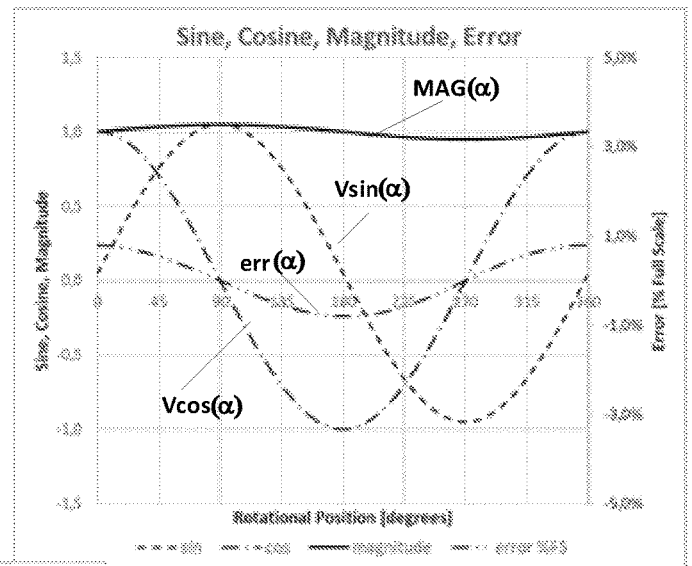
FIGS. 5A, 5B, and 5C illustrate a positive offset on the sine signal with an ideal cosine signal.
Figure 5B:
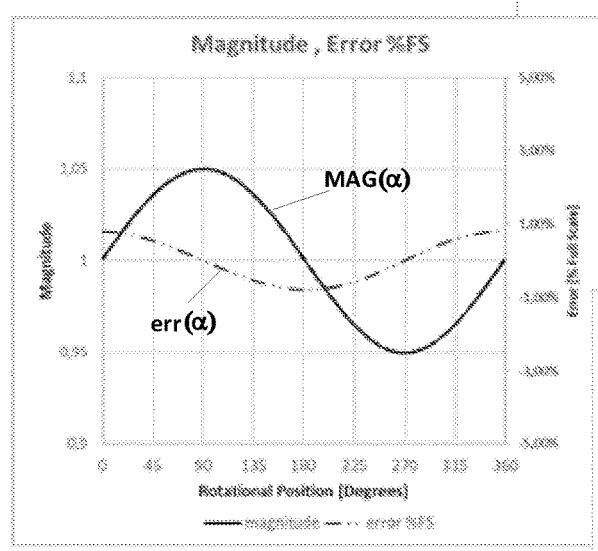
Figure 5C:
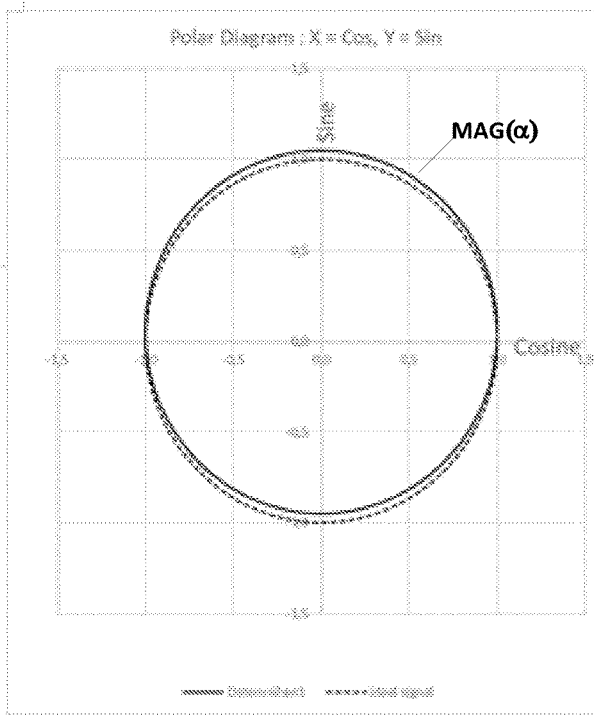

FIGS. 5A, 5B, and 5C illustrate an example with a positive offset on $V_{sin}(\alpha)$ with no corresponding offset on $V_{cos}(\alpha)$, which corresponds to case 1.1 of Table 1. FIG. 5A illustrates plots of $V_{sin}(\alpha)$ and $V_{cos}(\alpha)$ along with the corresponding values of MAG($\alpha$) and the error err($\alpha$). FIG. 5B is a plot of the values of MAG($\alpha$) and err($\alpha$) under the circumstance illustrated in FIG. 5A. FIG. 5C illustrates a polar graph of MAG($\alpha$) overlaid on an ideal polar plot of magnitude for comparison. As is illustrated, an offset on the sine signal $V_{sin}(o)$ results in a 1-periodic pattern in MAG($\alpha$) and err($\alpha$). This example illustrates a 5% positive offset on the sine signal $V_{sin}(\alpha)$. As is illustrated, the pattern of err($\alpha$) is phase shifted by 90 electrical degrees (1 st derivative) relative to the pattern of MAG($\alpha$). As is illustrated, the positive maximum of err($\alpha$) ($err_{max}$) occurs at a position of 0° while the negative maximum ($err_{min}$) occurs at 180°. Similarly, the positive maximum of MAG($\alpha$) ($MAGm_{ax}$) occurs at a position of 90° while the negative maximum ($MAG_{min}$) occurs at 270°. The ratio between normalized magnitude ripple and peak-to-peak normalized error is fixed at a ratio of 3.14:1, based on the normalized magnitude ripple $MAG_{norm}$ and the peak-to-peak normalized error $err_{norm}$ as discussed above. The polar plot illustrated in FIG. 5C shows the ideal figure as dotted circle compared with MAG($\alpha$), the actual pattern is shifted up on the Y-axis, the sine axis.

Figure 6A:
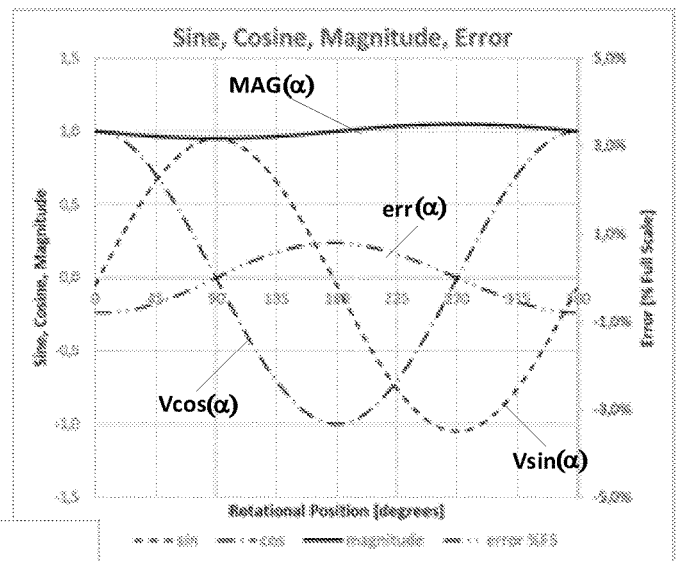
FIGS. 6A, 6B, and 6C illustrate a negative offset on the sine signal with an ideal cosine signal.
Figure 6B:
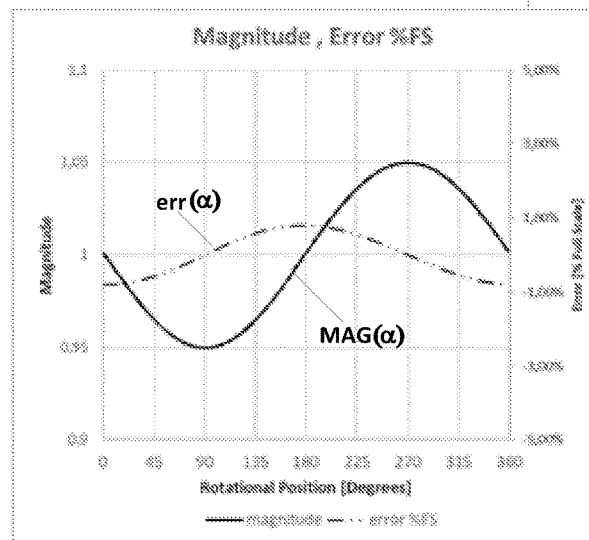
Figure 6C:
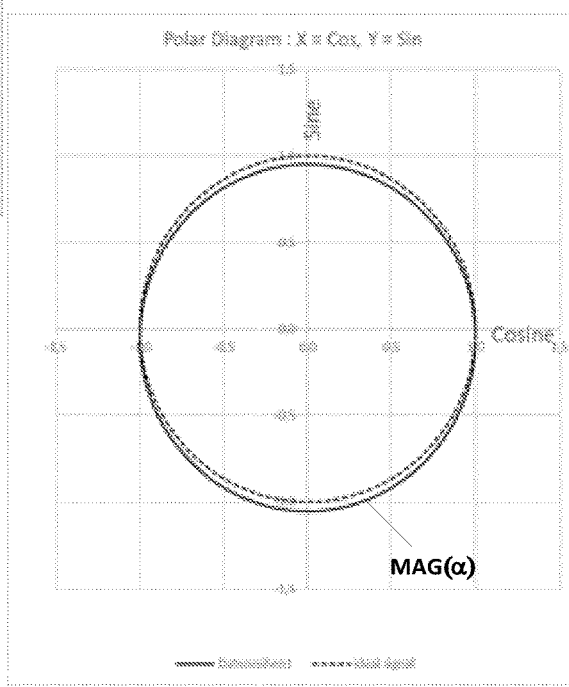

FIGS. 6A, 6B, and 6C illustrate an example with a negative offset on $V_{sin}(\alpha)$ with no corresponding offset on $V_{cos}(\alpha)$, which corresponds to error case 1.2 in Table 1. FIG. 6A illustrates plots of $V_{sin}(\alpha)$ and $V_{cos}(\alpha)$ along with the corresponding values of MAG($\alpha$) and the error err($\alpha$). FIG. 6B is a plot of the values of MAG($\alpha$) and err($\alpha$) under the circumstances illustrated in FIG. 6A. FIG. 6C illustrates a polar graph of MAG($\alpha$) overlaid on an ideal polar plot of magnitude for comparison. FIGS. 6A, 6B, and 6C illustrate a negative offset on the sine signal $V_{sin}(\alpha)$ results in a 1-periodic pattern in MAG($\alpha$) and err($\alpha$). This example illustrates a 5% negative offset on the sine signal $V_{sin}(\alpha)$. The pattern of err($\alpha$) is phase shifted by 90 electrical degrees (1st derivative) relative to the pattern of MAG($\alpha$). As is illustrated, the positive maximum of err($\alpha$) ($err_{max}$) occurs at a position of 180° while the negative maximum ($err_{min}$) occurs at 0°. Similarly, the positive maximum of MAG($\alpha$) ($MAG_{max}$) occurs at a position of 270° while the negative maximum ($MAG_{min}$) occurs at 90°. Normalized magnitude ripple and peak-to-peak normalized error is fixed at a ratio of 3.14:1, based on the normalized magnitude ripple $MAG_{norm}$ and the peak-to-peak normalized error $err_{norm}$ as discussed above. The polar plot illustrated in FIG. 6C shows the ideal figure as dotted circle, the actual pattern MAG($\alpha$) is shifted down on the Y-axis (sine).

Figure 7A:
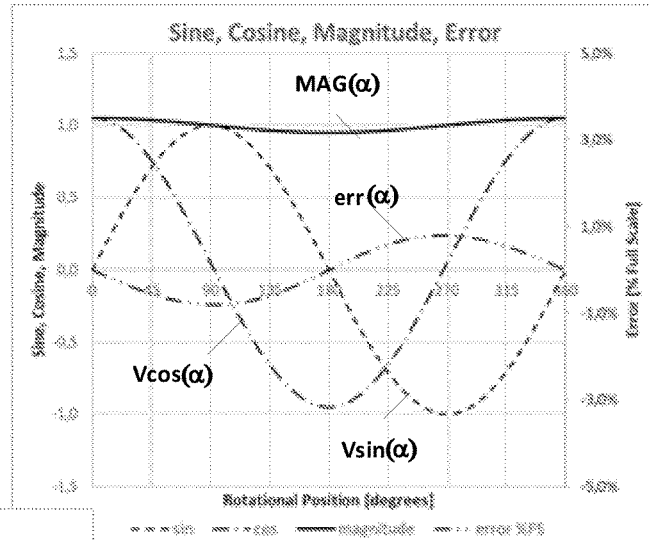
FIGS. 7A, 7B, and 7C illustrate a positive offset on the cosine signal with an ideal sine signal.
Figure 7B:
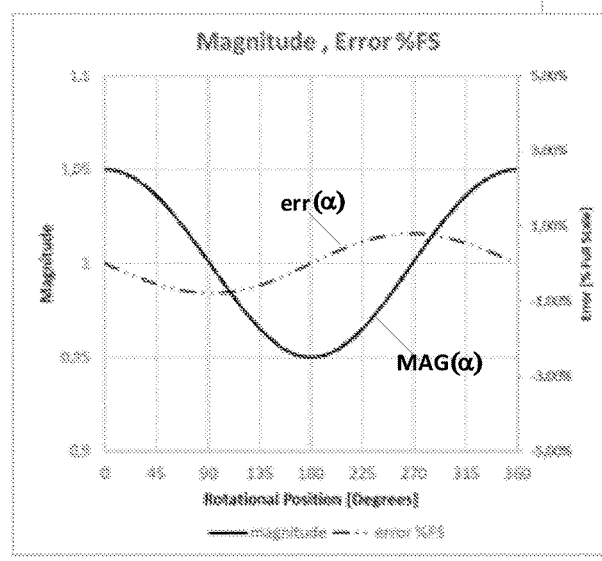
Figure 7C:
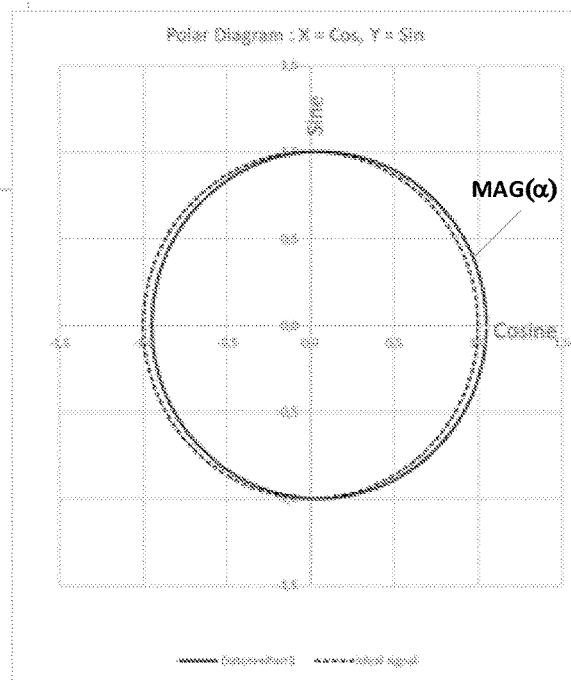

FIGS. 7A, 7B, and 7C illustrate an example with a positive offset on $V_{cos}(\alpha)$ with no corresponding offset on $V_{sin}(\alpha)$, which corresponds to error case 1.3 in Table 1. FIG. 7A illustrates plots of $V_{sin}(\alpha)$ and $V_{cos}(\alpha)$ along with the corresponding values of MAG($\alpha$) and the error err($\alpha$). FIG. 7B is a plot of the values of MAG($\alpha$) and err($\alpha$) under the circumstances illustrated in FIG. 7A. FIG. 7C illustrates a polar graph of MAG($\alpha$) overlaid on an ideal polar plot of magnitude for comparison. FIGS. 7A, 7B, and 7C illustrate the effects of the positive offset on a cosine signal. An offset on the cosine signal $V_{cos}(\alpha)$ results in a 1-periodic pattern in MAG($\alpha$) and err($\alpha$). FIGS. 7A, 7B, and 7C illustrate an example having a 5% positive offset on the cosine signal $V_{cos}(\alpha)$. The pattern in error err($\alpha$) is phase shifted by 90 electrical degrees (1st derivative) relative to the pattern in MAG($\alpha$). As is illustrated, the positive maximum of err($\alpha$) ($err_{max}$) occurs at a position of 270° while the negative maximum ($err_{min}$) occurs at 90°. Similarly, the positive maximum of MAG($\alpha$) ($MAG_{max}$) occurs at a position of 0° while the negative maximum ($MAG_{min}$) occurs at 180°. Normalized magnitude ripple and peak-to-peak normalized error is fixed at a ratio of 3.14:1, based on the normalized magnitude ripple $MAG_{norm}$, and the peak-to-peak normalized error $err_{norm}$ as discussed above. The polar plot of FIG. 7C shows the ideal figure as a dotted circle along with the actual pattern of MAG($\alpha$), which as illustrated is shifted right on the X-axis (cosine).

Figure 8A:
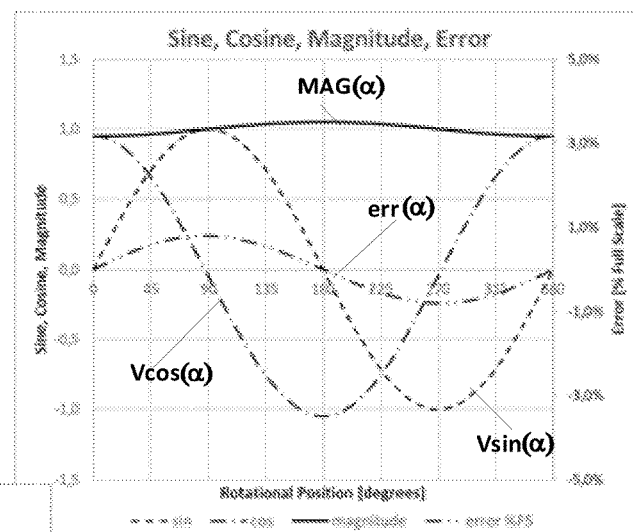
FIGS. 8A, 8B, and 8C illustrates a negative offset on the cosine signal with an ideal sine signal.
Figure 8B:
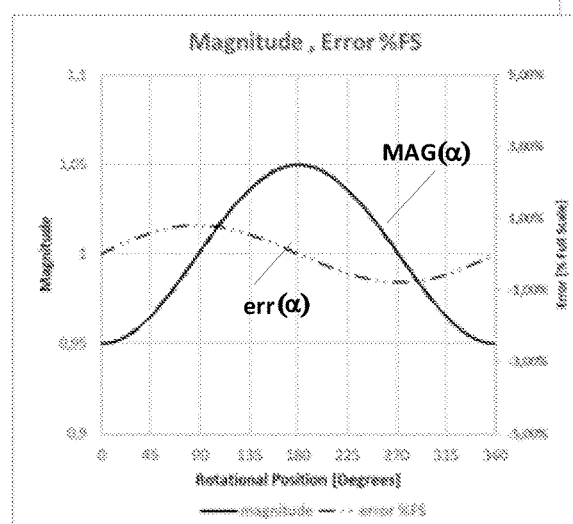
Figure 8C:
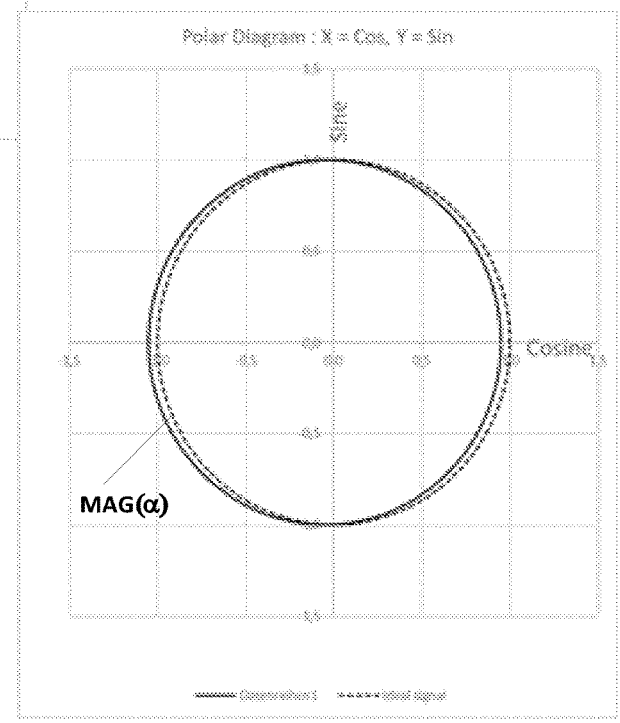

FIGS. 8A, 8B, and 8C illustrate an example with a negative offset on $V_{cos}(\alpha)$ with no corresponding offset on $V_{sin}(\alpha)$, which corresponds to error case 1.4 of Table 1. FIG. 8A illustrates plots of $V_{sin}(\alpha)$ and $V_{cos}(\alpha)$ along with the corresponding values of MAG($\alpha$) and the error err($\alpha$). FIG. 8B is a plot of the values of MAG($\alpha$) and err($\alpha$) under the circumstances illustrated in FIG. 8A. FIG. 8C illustrates a polar graph of MAG($\alpha$) overlaid on an ideal polar plot of magnitude for comparison. FIGS. 8A, 8B, and 8C illustrate a negative offset on cosine signal, which results in a 1-periodic pattern in MAG($\alpha$) and err($\alpha$). FIGS. 8A, 8B, and 8C illustrate an example having a 5% negative offset on the cosine signal $V_{cos}(\alpha)$. The pattern of err($\alpha$) is phase shifted by 90 electrical degrees (1st derivative) relative to the pattern of Magnitude MAG($\alpha$). As is illustrated, the positive maximum of err($\alpha$) ($err_{max}$) occurs at a position of 90° while the negative maximum ($err_{min}$) occurs at 270°. Similarly, the positive maximum of MAG($\alpha$) ($MAG_{max}$) occurs at a position of 180° while the negative maximum ($MAG_{min}$) occurs at 0°. Normalized magnitude ripple and peak-to-peak normalized error is fixed at a ratio of 3.14:1, based on the normalized magnitude ripple $MAG_{norm}$ and the peak-to-peak normalized error $err_{norm}$ as discussed above. The polar plot illustrated in FIG. 8C shows the ideal figure as dotted circle overlaid on the actual pattern of MAG($\alpha$), which is shifted left on the X-axis (cosine).

FIGS. 9A, 9B, and 9C illustrate an example with a combination of offsets on both the cosine signal $V_{cos}(\alpha)$ and the sine signal $V_{sin}(\alpha)$, which corresponds to error case 1.5 in Table 1. FIG. 9A illustrates plots of $V_{sin}(\alpha)$ and $V_{cos}(\alpha)$ along with the corresponding values of MAG($\alpha$) and the error err($\alpha$). FIG. 9B is a plot of the values of MAG($\alpha$) and err($\alpha$) under the circumstances illustrated in FIG. 9A. FIG. 9C illustrates a polar graph of MAG($\alpha$) overlaid on an ideal polar plot of magnitude for comparison. FIGS. 9A, 9B, and 9C illustrate a combination of offsets on both the sine and cosine signals $V_{cos}(\alpha)$ and $V_{sin}(\alpha)$, which results in a 1-periodic pattern in both Magnitude MAG($\alpha$) and error err($\alpha$). FIGS. 9A, 9B, and 9C illustrate an example having a 5% positive offset on the sine signal $V_{sin}(\alpha)$ and a 5% negative offset on the cosine signal $V_{cos}(\alpha)$. The pattern in error err($\alpha$) is phase shifted by 90 electrical degrees (1st derivative) relative to the pattern in magnitude MAG($\alpha$). As is illustrated, the positive maximum of err($\alpha$) ($err_{max}$) and negative maximum ($err_{min}$) occurs at variable locations, but are characterized with a 1-periodic sinusoidal pattern. Similarly, the positive maximum of MAG($\alpha$) ($MAG_{max}$) and the negative maximum ($MAG_{min}$) are variable, but are characterized with a 1-periodic sinusoidal pattern that is shifted in position by 90° from that of the error maxima. Magnitude ripple and peak-to-peak normalized error is fixed at a ratio of 3.14:1, based on the normalized magnitude ripple $MAG_{norm}$ and the peak-to-peak normalized error $err_{norm}$ as discussed above. The polar plot illustrated in FIG. 9C shows the ideal figure as dotted circle the actual pattern of MAG ($\alpha$), which is shifted both left on the X-axis (cosine) and up on the Y-axis (sine).

FIGS. 10A, 10B, and 10C illustrate an example where the amplitude of the cosine signal $V_{cos}(\alpha)$ is less than that of the sine signal $V_{sin}(\alpha)$, which corresponds to error case 2.1 of Table 1. FIG. 10A illustrates plots of $V_{sin}(\alpha)$ and $V_{cos}(\alpha)$ along with the corresponding values of MAG($\alpha$) and the error err($\alpha$). FIG. 10B is a plot of the values of magnitude MAG($\alpha$) and error err($\alpha$) under the circumstances illustrated in FIG. 10A. FIG. 10C illustrates a polar graph of MAG($\alpha$) overlaid on an ideal polar plot of magnitude for comparison. FIGS. 10A, 10B, and 10C illustrate an amplitude of the sine signal $V_{sin}(\alpha)$ that is greater than the amplitude of the cosine signal $V_{cos}(\alpha)$. An amplitude mismatch between the sine and cosine signals $V_{sin}(\alpha)$ and $V_{cos}(\alpha)$ results in a 2-periodic pattern in magnitude MAG($\alpha$) and error err($\alpha$). FIGS. 10A, 10B, and 10C illustrate an example having a 5% larger sine signal $V_{sin}(\alpha)$ relative to the cosine signal $V_{cos}(\alpha)$. The pattern in error err($\alpha$) is phase shifted by 90 electrical degrees (1st derivative) relative to the pattern in magnitude MAG($\alpha$). As is illustrated, the positive maximum of err($\alpha$) ($err_{max}$) occurs at a positions 45° and 225° while the negative maximum ($err_{min}$) occurs at 135° and 315°. Similarly, the positive maximum of MAG($\alpha$) ($MAG_{max}$) occurs at a position of 90° and 270° while the negative maximum ($MAG_{min}$) occurs at 0° and 180 Magnitude ripple and peak-to-peak normalized error is fixed at a ratio of 3.14:1, based on the normalized magnitude ripple $MAG_{norm}$ and the peak-to-peak normalized error $err_{norm}$ as discussed above. The polar plot illustrated in FIG. 10C shows the ideal figure as dotted circle and the actual pattern MAG($\alpha$) in this example, which is stretched in the Y-axis (sine).

FIGS. 11A, 11B, and 11C illustrate an example where the amplitude of the cosine signal $V_{cos}(\alpha)$ is greater than that of the sine signal $V_{sin}(\alpha)$, which corresponds to error case 2.2 of Table 1. FIG. 11A illustrates plots of $V_{sin}(\alpha)$ and $V_{cos}(\alpha)$ along with the corresponding values of MAG($\alpha$) and the error err($\alpha$). FIG. 11B is a plot of the values of magnitude MAG($\alpha$) and error err($\alpha$) under the circumstances illustrated in FIG. 11A. FIG. 11C illustrates a polar graph of MAG($\alpha$) overlaid on an ideal polar plot of magnitude for comparison for the example illustrated in FIG. 11A. FIGS. 11A, 11B, and 11C illustrate an example where the amplitude of the cosine signal $V_{cos}(\alpha)$ is greater than the amplitude of the sine signal $V_{sin}(\alpha)$. An amplitude mismatch between the sine and cosine signals $V_{sin}(\alpha)$ and $V_{cos}(\alpha)$ results in a 2-periodic pattern in magnitude MAG($\alpha$) and error err($\alpha$). FIGS. 11A, 11B, and 11C show an example having a 5% larger cosine signal $V_{cos}(\alpha)$ relative to the sine signal $V_{sin}(\alpha)$. The pattern of error err($\alpha$) is phase shifted by 90 electrical degrees (1st derivative) relative to the pattern of the magnitude MAG($\alpha$). As is illustrated, the positive maximum of err($\alpha$) ($err_{max}$) occurs at a positions 135° and 315° while the negative maximum ($err_{min}$) occurs at 45° and 225°. Similarly, the positive maximum of MAG($\alpha$) ($MAG_{max}$) occurs at a position of 0° and 180° while the negative maximum ($MAG_{min}$) occurs at 90° and 270°. Magnitude ripple and peak-to-peak normalized error is fixed at a ratio of 3.14:1, based on the normalized magnitude ripple $MAG_{norm}$ and the peak-to-peak normalized error $err_{norm}$ as discussed above. The polar plot illustrated in FIG. 11C shows the ideal figure as dotted circle with the actual pattern of MAG($\alpha$), which is stretched in the X-axis (cosine).

FIGS. 12A, 12B, and 12C illustrate an example where cosine signal $V_{cos}(\alpha)$ to sine phase signal $V_{sin}(\alpha)$ is less than 90 degrees, which corresponds to error case 3.1 of Table 1. FIG. 12A illustrates plots of $V_{sin}(\alpha)$ and $V_{cos}(\alpha)$ along with the corresponding values of MAG($\alpha$) and the error err($\alpha$). FIG. 12B is a plot of the values of magnitude MAG($\alpha$) and error err($\alpha$) under the circumstances illustrated in FIG. 12A. FIG. 12C illustrates a polar graph of MAG($\alpha$) overlaid on an ideal polar plot of magnitude for comparison for the example illustrated in FIG. 12A. FIGS. 12A, 12B, and 12C illustrate a cosine to sine phase shift of less than 90 degrees. A phase mismatch between sine and cosine $V_{sin}(\alpha)$ and $V_{cos}(\alpha)$ signals of <90° results in a 2-periodic pattern in magnitude MAG($\alpha$) and error err($\alpha$). Shown is an example having an 85° phase shift of the cosine signal $V_{cos}(\alpha)$ relative to the sine signal $V_{sin}(\alpha)$ (i.e., the phase shift discussed above $\varphi$ is −5°). The pattern of error err($\alpha$) is phase shifted by 90 electrical degrees (1st derivative) relative to the pattern of magnitude MAG($\alpha$). As is illustrated, the positive maximum of err($\alpha$) ($err_{max}$) occurs at a positions 0° and 180° while the negative maximum ($err_{min}$) occurs at 90° and 270°. Similarly, the positive maximum of MAG($\alpha$) ($MAG_{max}$) occurs at a position of 45° and 225° while the negative maximum ($MAG_{min}$) occurs at 135° and 315°. Magnitude ripple and peak-to-peak normalized error is fixed at a ratio of 3.14:1, based on the normalized magnitude ripple MAG no and the peak-to-peak normalized error $err_{norm}$ as discussed above. but the absolute error is always negative. The polar plot illustrated in FIG. 12C shows the ideal figure as dotted circle and the actual pattern of MAG ($\alpha$), which is stretched in the 45° direction.

Figure 14A:
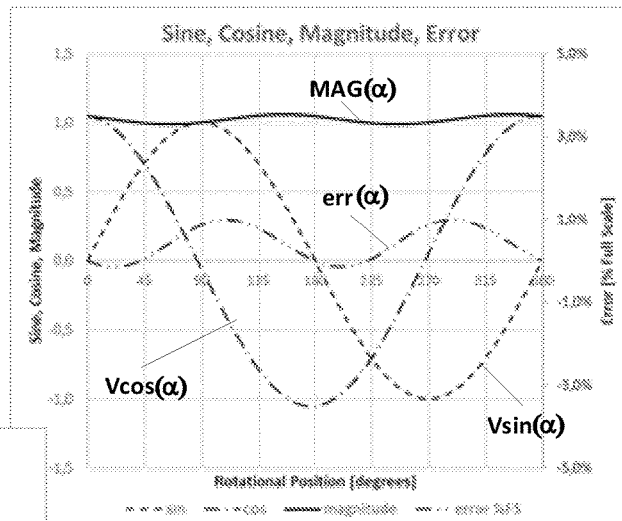
FIGS. 14A, 14B, and 14C illustrates a combination of gain and phase errors.
Figure 14B:
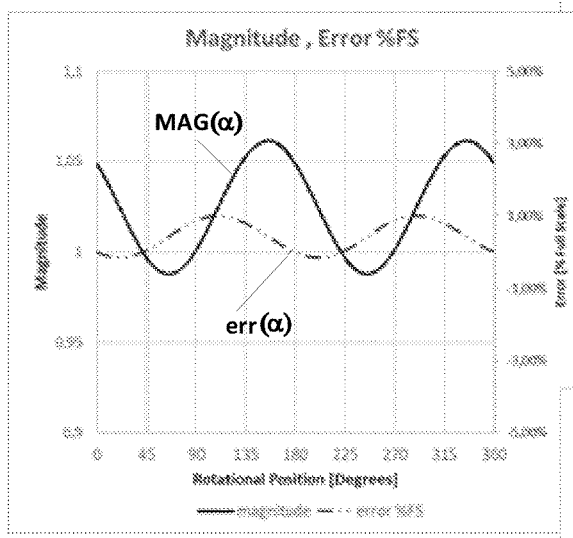
Figure 14C:
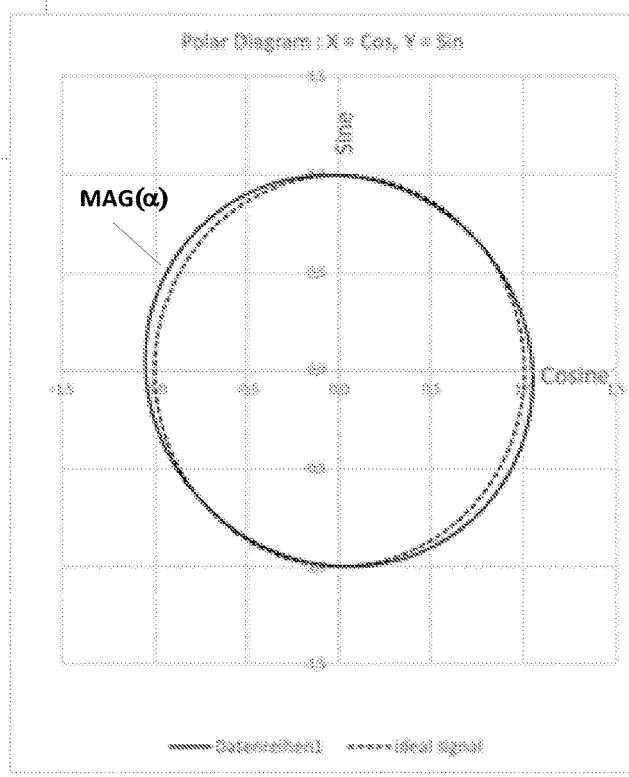

FIGS. 13A, 13B, and 13C illustrate an example where cosine signal $V_{cos}(\alpha)$ to sine phase signal $V_{sin}(\alpha)$ is greater than 90 degrees, which corresponds to error case 3.2 of Table 1. FIG. 13A illustrates plots of $V_{sin}(\alpha)$ and $V_{cos}(\alpha)$ along with the corresponding values of MAG($\alpha$) and the error err($\alpha$). FIG. 13B is a plot of the values of magnitude MAG($\alpha$) and error err($\alpha$) under the circumstances illustrated in FIG. 13A. FIG. 13C illustrates a polar graph of MAG($\alpha$) overlaid on an ideal polar plot of magnitude MAG($\alpha$) for comparison in the example illustrated in FIG. 13A. FIGS. 13A, 13B, and 13C illustrate a cosine to sine phase shift of greater than 90 degrees. A phase mismatch between the cosine signal $V_{cos}(\alpha)$ and the sine signal $V_{sin}(\alpha)$ of >90° results in a 2-periodic pattern in the magnitude MAG($\alpha$) and error err($\alpha$). FIGS. 13A, 13B, and 13C show an example having a 95° phase shift of the cosine signal relative to the sine signal (i.e. the phase shift discussed above $\varphi$ is 5°). The pattern in err($\alpha$) is phase shifted by 90 electrical degrees (1st derivative) relative to the pattern in magnitude MAG($\alpha$). As is illustrated, the positive maximum of err($\alpha$) ($err_{max}$) occurs at a positions 90° and 270° while the negative maximum ($err_{min}$) occurs at 0° and 180°. Similarly, the positive maximum of MAG(ca) ($MAG_{max}$) occurs at a position of 135° and 315° while the negative maximum ($MAG_{min}$) occurs at 45° and 225°. Magnitude ripple and peak-to-peak normalized error is fixed at a ratio of 3.14:1, based on the normalized magnitude ripple $MAG_{norm}$ and the peak-to-peak normalized error $err_{norm}$ as discussed above. However, the absolute error is always positive. FIG. 13C illustrates a polar plot that shows the ideal figure as dotted circle FIGS. 14A, 14B, and 14C illustrate an example with a combination of gain and phase errors in the cosine signal $V_{cos}(\alpha)$ and the sine signal $V_{sin}(\alpha)$, which corresponds to case 3.3 of Table 1. FIG. 14A illustrates plots of $V_{sin}(\alpha)$ and $V_{cos}(\alpha)$ along with the corresponding values of MAG($\alpha$) and the error err($\alpha$). FIG. 14B is a plot of the values of magnitude MAG(c) and error err(α) under the circumstances illustrated in FIG. 14A. FIG. 14C illustrates a polar graph of MAG(α) overlaid on an ideal polar plot of magnitude MAG(α) for comparison in the example illustrated in FIG. 14A. FIGS. 14A, 14B, and 14C illustrate a combination of gain and phase errors. The combination of both amplitude and phase mismatch between sine and cosine signals $V_{sin}(\alpha)$ and $V_{cos}(\alpha)$ results in a 2-periodic pattern in magnitude MAG(α) and error err(α). FIGS. 14A, 14B, and 14C illustrate an example having a 93° phase shift of the cosine signal $V_{cos}(\alpha)$ relative to the sine signal $V_{sin}(\alpha)$ and a sine signal $V_{sin}(\alpha)$ that is 5% larger relative to the cosine signal $V_{cos}(\alpha)$. The pattern for err(α) is phase shifted by 90 electrical degrees (1st derivative) relative to the pattern of magnitude MAG(α). As is illustrated, the positive maximum of err(α) ($err_{max}$) and the negative maximum ($err_{min}$) occur at variable locations. Similarly, the positive maximum of MAG(α) ($MAG_{max}$) and the negative maximum ($MAG_{min}$) occur occur at variable locations. Magnitude ripple and peak-to-peak normalized error is fixed at a ratio of 3.14:1, based on the normalized magnitude ripple $MAG_{norm}$ and the peak-to-peak normalized error $err_{norm}$ as discussed above. However, the error is not symmetric to zero. The polar plot illustrated in FIG. 14C shows the ideal figure as dotted circle and the actual pattern of magnitude MAG(α), which is stretched in both the X-axis and in 135° direction.

FIGS. 15A, 15B, and 15C illustrate an example with a combination of offset and gain errors in the cosine signal $V_{cos}(\alpha)$ and the sine signal $V_{sin}(\alpha)$, which corresponds to error case 4.1 of Table 1. FIG. 15A illustrates plots of $V_{sin}(\alpha)$ and $V_{cos}(\alpha)$ along with the corresponding values of MAG(a) and the error err(α). FIG. 15B is a plot of the values of magnitude MAG(α) and error err(α) under the circumstances illustrated in FIG. 15A. FIG. 15C illustrates a polar graph of MAG(α) overlaid on an ideal polar plot of magnitude MAG(α) for comparison in the example illustrated in FIG. 15A. FIGS. 15A, 15B, and 15C illustrate a combination of offset and gain errors. The combination of both offset errors and amplitude mismatch between sine and cosine signals $V_{sin}(\alpha)$ and $V_{cos}(\alpha)$ results in a non-sinusoidal pattern in magnitude MAG(α) and error err(α), combining both 1-periodic and 2-periodic elements. FIGS. 15A, 15B, and 15C show an example having a 3% offset and 5% gain mismatch of the cosine signal $V_{cos}(\alpha)$ relative to the sine signal $V_{sin}(\alpha)$. The pattern in error err(α) does not resemble a sinusoidal waveform and is also no longer the direct 1st derivative of the pattern in magnitude MAG(α). The ratio between the ripple in magnitude MAG(α) and the peak-to-peak in error err(α) is not fixed at 3.14:1. In this particular case, the ratio is 2.75:1. The polar plot illustrated in FIG. 15C shows the ideal figure as dotted circle and the actual pattern of magnitude MAG(α), which is stretched and/or shifted in any direction depending on the signal having an offset and the amplitude mismatch (sine>cosine or cosine>sine). There is still a resemblance between the normalized magnitude ripple and peak-to-peak error, but since this ratio is no longer fixed at 3.14:1, the error estimation for such multi-point failures can only be made with less precision.

FIGS. 16A, 16B, and 16C illustrate an example with a combination of offset and phase errors in the cosine signal $V_{cos}(\alpha)$ and the sine signal $V_{sin}(\alpha)$, which corresponds to error case 4.2 of Table 1. FIG. 16A illustrates plots of $V_{sin}(\alpha)$ and $V_{cos}(\alpha)$ along with the corresponding values of MAG (α) and the error err(ax). FIG. 16B is a plot of the values of magnitude MAG(c) and error err(α) under the circumstances illustrated in FIG. 16A. FIG. 16C illustrates a polar graph of MAG(α) overlaid on an ideal polar plot of magnitude MAG(α) for comparison in the example illustrated in FIG. 16A. FIGS. 16A, 16B, and 16C illustrate a combination of both offset and phase errors. The combination of both offset and phase errors between sine and cosine signals $V_{sin}(\alpha)$ and $V_{cos}(\alpha)$ results in a non-sinusoidal pattern in magnitude MAG(α) and error err(α), combining both 1-periodic and 2-periodic elements. FIGS. 16A, 16B, and 16C show an example having a 5% offset and 95° phase shift of the cosine signal $V_{cos}$(at) relative to the sine signal $V_{sin}(\alpha)$. The pattern of err(α) does not resemble a sinusoidal waveform and is also no longer the direct 1st derivative of the pattern of magnitude MAG(α) pattern. The ratio between the normalized magnitude ripple $MAG_{norm}$ and the normalized peak-to-peak in error $err_{norm}$ is not fixed at 3.14:1, in this particular case, the ratio is 3.53:1. The polar plot illustrated in FIG. 16C shows the ideal figure as dotted circle and the actual pattern MAG(α), which is stretched and/or shifted in the 45° or 135° direction depending on the signal having an offset and the type of phase shift (below or above 90°). There is still a resemblance between the ripple of magnitude MAG(α) and the peak-to-peak of error err(α), but since this ratio is no longer fixed at 3.14:1 the error estimation for such multi-point failures can only be made with less precision.

FIGS. 17A, 17B, and 17C illustrate an example with a combination of offset, gain, and phase errors in the cosine signal $V_{cos}(\alpha)$ and the sine signal $V_{sin}(\alpha)$, which corresponds to error case 4.3 of Table 1. FIG. 17A illustrates plots of $V_{sin}(\alpha)$ and $V_{cos}(\alpha)$ along with the corresponding values of MAG(α) and the error err(α). FIG. 17B is a plot of the values of magnitude MAG(α) and error err(α) under the circumstances illustrated in FIG. 17A. FIG. 17C illustrates a polar graph of MAG(α) overlaid on an ideal polar plot of magnitude MAG(α) for comparison in the example illustrated in FIG. 17A. FIGS. 17A, 17B, and 17C illustrate a combination of offset, gain, and phase errors, which results in a non-sinusoidal pattern in magnitude MAG(α) and error err(α), combining both 1-periodic and 2-periodic elements.

FIGS. 17A, 17B, and 17C show an example having a 3% offset of the sine signal $V_{sin}(\alpha)$, a 5% larger cosine signal $V_{cos}(\alpha)$ relative to the sine signal $V_{sin}(\alpha)$, and an 87° phase shift between the cosine signal $V_{cos}(\alpha)$ and the sine signal $V_{sin}(\alpha)$. The pattern in error err(α) does not resemble a sinusoidal waveform and is also no longer the direct 1st derivative of the pattern in magnitude MAG(α). The ratio between in the normalized magnitude ripple $MAG_{norm}$ and the normalized peak-to-peak error $err_{norm}$ is not fixed at 3.14:1, in this particular case, the ratio is 3.15:1. The polar plot illustrated in FIG. 17C shows the ideal figure as dotted circle and the actual pattern of magnitude MAG(α), which is both shifted, stretched and rotated, depending on the signal having an offset and gain mismatch and the type of phase shift (below or above 90°). There is still a resemblance between the ripple of magnitude MAG(α) and the peak-to-peak in error err(α), but since this ratio is no longer fixed at 3.14:1, the error estimation for such multi-point failures can only be made with less precision.

For any single point failure resulting in an offset, gain, or phase error, the error estimation from the Magnitude ripple provides an error estimation with high precision. The method can also be applied to multi-point failures, as long as the failures result from the same error type, having either 1-periodic or 2-periodic patterns. For multi-point failures which are a combination of 1-periodic and 2-periodic failures, this method can only be applied with less precision.

The above detailed description is provided to illustrate specific embodiments of the present invention and is not intended to be limiting. Numerous variations and modifications within the scope of the present invention are possible. The present invention is set forth in the following claims.

What is claimed is:

1. A method of correcting for errors in a rotational position sensor having a sine signal and a cosine signal, comprising:
compiling data from the sine signal and the cosine signal over a period of rotation of a motor shaft, wherein the sine signal is received from a sine coil and the cosine signal is received from a cosine coil, the sine coil and the cosine coil receiving signals from a target rotated over the sine coil and the cosine coil as the motor shaft is rotated through the period of rotation;
determining offset correction parameters from the data;
correcting the data with the offset correction parameters;
determining amplitude difference parameters from the data;
correcting the data with the amplitude difference parameters;
determining phase difference parameters from the data;
correcting the data with the phase difference parameters; and
using the offset correction parameters, the amplitude difference parameters, and the phase difference parameters to correct the sine signal and the cosine signal.

2. The method of claim 1, wherein compiling data includes
recording values of the sine signal and the cosine signal over the period; and
determining the minimum and maximum values of the sine signal and the cosine signal from the values.

3. The method of claim 2, wherein compiling data further includes
determining a magnitude from the sine signal and the cosine signal over the period;
determining a maximum and minimum of the magnitude; and
determining an estimated error from the maximum and minimum of the magnitude.

4. The method of claim 3, wherein determining the estimated error includes
determining a normalized magnitude from the maximum and minimum magnitude; and
determining the estimated error from the normalized magnitude.

5. The method of claim 1, wherein the offset parameters includes a sine offset given by the average of the minimum and maximum sine signals adjusted by a reference voltage and a cosine offset given by the average of the minimum and maximum cosine signals adjusted by the reference voltage.

6. The method of claim 1, wherein the amplitude mismatch is given by the difference between the maximum sine signal and the minimum sine signal divided by the difference between the maximum cosine signal and the minimum cosine signal.

7. The method of claim 1, wherein determining the phase difference includes:
determining the maximum and minimum of the sum of the sine signal and the cosine signal over the period;
determining the maximum and minimum of the difference of the sine signal and the cosine signal over the period;
determining a normalized sum, given by the difference between the maximum sum and the minimum sum divided by the sum of the maximum sum and the minimum sum;
determining a normalized difference, given by the difference between the maximum difference and the minimum difference divided by the sum of the maximum difference and the minimum difference; and
determining the phase angle as twice the arctan of the ratio between the normalized difference and the normalized sum.

8. The method of claim 1, further including:
calculating the magnitude from the data;
determining a first derivative of the magnitude; and
determining an angular position correction from the first derivative.

9. The method of claim 1, wherein the offset correction parameters, the amplitude difference parameters, and the phase difference parameters are calculated periodically.

10. The method of claim 1, wherein the offset correction parameters, the amplitude difference parameters, and the phase difference parameters are calculated continuously.

* * * * *